US011930827B2

(12) United States Patent
Horgan

(10) Patent No.: US 11,930,827 B2
(45) Date of Patent: Mar. 19, 2024

(54) MAGNETIC ROLLING SYSTEM FOR PLIABLE MATERIAL

(71) Applicant: Gary Anthony Horgan, Waltham, MA (US)

(72) Inventor: Gary Anthony Horgan, Waltham, MA (US)

( * ) Notice: Subject to any disclaimer, the term of this patent is extended or adjusted under 35 U.S.C. 154(b) by 1443 days.

(21) Appl. No.: 16/153,701

(22) Filed: Oct. 5, 2018

(65) Prior Publication Data

US 2019/0104743 A1  Apr. 11, 2019

Related U.S. Application Data

(60) Provisional application No. 62/568,784, filed on Oct. 5, 2017.

(51) Int. Cl.
*A21C 3/02* (2006.01)
*A21C 11/10* (2006.01)

(52) U.S. Cl.
CPC ............ *A21C 3/021* (2013.01); *A21C 11/106* (2013.01)

(58) Field of Classification Search
CPC ...... A21C 3/021; A21C 11/103; A21C 11/106
See application file for complete search history.

(56) References Cited

U.S. PATENT DOCUMENTS

| | | | | |
|---|---|---|---|---|
| 2,699,127 A | * | 1/1955 | Orosz | A21C 3/02 249/155 |
| 3,746,992 A | * | 7/1973 | Serembe | B43L 5/022 33/DIG. 1 |
| 4,521,174 A | * | 6/1985 | Kornhauser | A21C 3/021 425/374 |
| 5,546,850 A | * | 8/1996 | Zaveri | A21C 3/021 99/349 |
| 7,581,940 B2 | * | 9/2009 | Hosogane | A21C 3/028 425/328 |
| 7,833,078 B2 | * | 11/2010 | Kretzschmar | A63H 33/046 446/92 |
| 8,360,410 B1 | * | 1/2013 | Rockwood | A21C 11/00 269/302.1 |
| 8,679,563 B1 | * | 3/2014 | Herrera | A23L 7/13 425/436 RM |
| 9,648,986 B1 | * | 5/2017 | Byrne | A23P 30/00 |
| 10,035,061 B1 | * | 7/2018 | Huffman | A63F 3/00694 |
| 2003/0129291 A1 | * | 7/2003 | Rast | C10L 5/365 426/549 |
| 2006/0062879 A1 | * | 3/2006 | Anderson | A21C 3/06 426/502 |
| 2008/0202353 A1 | * | 8/2008 | Hosogane | A23P 30/10 99/450.2 |
| 2008/0206389 A1 | * | 8/2008 | Hosogane | A23L 7/196 425/322 |
| 2012/0222987 A1 | * | 9/2012 | Cucci | A21C 11/00 206/526 |

(Continued)

*Primary Examiner* — Seyed Masoud Malekzadeh

(57) ABSTRACT

A Magnetic Rolling System for Pliable Material is described as a rolling board having the ability to magnetically attract spacing and guide rails on which a rolling pin travels, thus keeping a rolling pin a specified distance above the rolling board and on track. In addition, these spacing and guide rails are also used to hold a rolling diagram, a cutting mat, and a sheet of parchment paper firmly in place. The Magnetic Rolling System for Pliable Material makes rolling pliable material such as dough and compounds to a precise thickness, simple and almost effortless.

21 Claims, 18 Drawing Sheets

(56) References Cited

U.S. PATENT DOCUMENTS

2015/0069648 A1* 3/2015 Baillie .................. A21C 3/021
　　　　　　　　　　　　　　　　　　　　　　　33/562
2016/0366895 A1* 12/2016 Copen .................... A21C 3/025

* cited by examiner

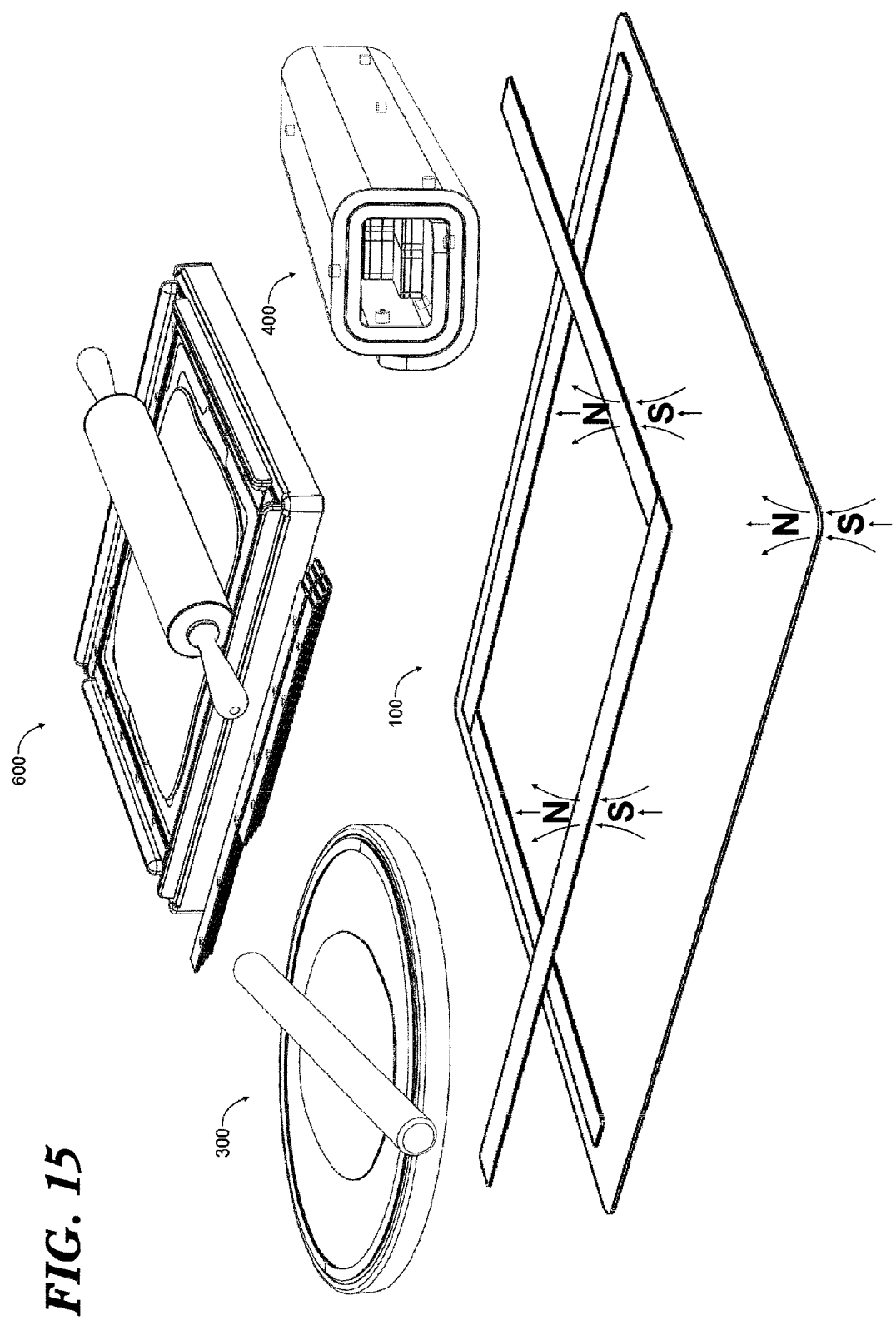

MAGNETIC ROLLING SYSTEM FOR PLIABLE MATERIAL

CROSS-REFERENCE TO RELATED APPLICATIONS

This application claims the benefit of U.S. Provisional Patent App. No. 62/568,784, filed on Oct. 5, 2017, entitled "Magnetic Pastry Board with Rolling Pin Spacers and Guides"; and the entire contents of this application is incorporated herein by reference.

The subject matter of this application is further referenced in PCT Patent App. No. PCT/US16/24459, filed on Mar. 28, 2016, entitled Magnetic Rolling System for Pliable Material, which was published by WIPO on Oct. 6, 2016 under No. WO 2016/160671.

The PCT Patent App. No. PCT/US16/24459 claimed the benefit of Provisional Patent App. No. 62/138,980, filed on Mar. 27, 2015, entitled "Magnetic Pastry Board with Rolling Pin Spacers and Guides", and also claimed the benefit of Provisional Patent App. No. 62/295,095, filed on Feb. 14, 2016, entitled "Magnetic Rolling Board, Plate, Mat and Rolling Pin Spacers, a Supplement".

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC OR AS A TEXT FILE

Not Applicable.

BACKGROUND OF THE INVENTION

Field of the Invention

The present magnetic rolling system for pliable material relates generally to the precise shaping of pliable materials, and more particularly to the precise flattening of moldable materials including but not limited to materials such as modeling clay, craft compounds such as Sculpey® oven-bake clays from Polyform Products Company of Elk Grove Village, IL, U.S.A., epoxy putty and food materials such as cookie dough, pie crust, cake fondant, and other confectionary delights.

Description of Related Art

Adjustable pastry boards disclose rolling out the perfect thickness dough, but these are antiquated devices and don't provide the convenience and all the features that the magnetic rolling system for pliable material of the disclosed embodiments provides.

For instance, U.S. Pat. No. 781,239, Pastry Board, uses a fixed adjustable frame that has screws in each of its four corners to raise and lower said frame in order to adjust the height of a rolling pin above the rolling surface of said board.

U.S. Pat. No. 2,818,666, Dough Rolling Means, uses an inner rolling board in conjunction with an outer frame, keys, and interior keyways that allow the frame top edge to be set at several different heights above the surface of said pastry board.

U.S. Pat. No. 2,699,127, Pastry Board, uses two "T" shaped extrusions with each member of said "T" being a different length. These members are each designed to fit into each of two predisposed grooves in said pastry board that are located proximate to and parallel with the two long edges of said board. By rotating the "T" shaped extrusion and placing different members into said groove, a different height is achieved from the upper most portion of the spacer to the rolling surface of the board.

FR Patent No. 2,456,479, Rolling Pastry etc. into Sheet of Regular Thickness—with Rolling Pin Bearing on Setting Bars Laid on Pastry Board, uses a pastry board in conjunction with two rectangular shaped extrusions that act as spacers. These spacers are simply laid on top of the pastry board proximate to and parallel with the long edges of said pastry board, relying on gravity and downward forces applied by any rolling pins, in order to stay in place.

BRIEF SUMMARY OF THE INVENTION

The following summary is included only to introduce some concepts discussed in the Detailed Description below. This summary is not comprehensive and is not intended to delineate the scope of protectable subject matter, which is set forth by the claims presented at the end.

The magnetic rolling system for pliable material overcomes the disadvantages of the prior art by providing a convenient means for achieving both a precise and uniform thickness to rolled materials, and also has the ability to hold parchment paper, a cutting mat, a template pattern, or any other sheet material, firmly in place. The system is also simple to clean.

The magnetic rolling system for pliable material, also called a magnetic rolling system, generally comprises a magnetic rolling board, one or more magnetic rolling pin spacers, and may also comprise one or more magnetic rolling pin spacer guides. The magnetic rolling board comprises a top planar surface, also called the rolling surface, on which pliable material may be rolled out using a rolling pin, while also having the ability to magnetically attract, or be attracted to, at least one rolling pin spacer, and at least two rolling pin spacer guides. These components obtain their magnetic properties by being made of, or containing within, magnetic or ferromagnetic material, such as but not limited to, standard permanent magnets, rare earth permanent magnets, or carbon steel.

The magnetic rolling board on which pliable material is rolled out, can be produced in many different forms, such as but not limited to; a thin rigid plate made of magnetic or ferromagnetic material, such as but not limited to, 16 gauge sheet metal; a flexible mat made of magnetic, or ferromagnetic material, such as but not limited to, vehicle graphics magnet sheet, or made of an elastomer, such as but not limited to, silicon that contains magnetic, or ferromagnetic material; or a solid, or shelled out, thick rigid board made of a material, such as but not limited to, magnetic, or ferromagnetic material, or plastic, composite, or wood, which shall have magnetic, or ferromagnetic material, affixed flush set into the top surface, or embedded within just under said top surface.

The rolling pin spacers, upon which a rolling pin travels, keep the rolling pin's cylindrical surface a predetermined distance above and horizontal to the top planar surface of the magnetic rolling board described herein, and can be produced in many different forms, such as but not limited to, rigid spacers made of magnetic, or ferromagnetic material or non-magnetic materials such as plastic, composite, or wood, which shall contain magnetic, or ferromagnetic material, or a flexible spacer made of flexible magnetic, or ferromagnetic material, or made of an elastomer, which shall contain magnetic, or ferromagnetic material.

The rolling pin spacer guides, on which a rolling pin travels, keep said rolling pin on track by incorporating vertical side walls called rolling pin guides, keep said rolling pin's cylindrical surface a predetermined distance above and horizontal to the planar surface of the magnetic pastry board described herein, and can be produced in many different forms, such as but not limited to, rigid spacer guides made of magnetic, or ferromagnetic material or non-magnetic materials such as plastic, composite, or wood, which shall contain magnetic, or ferromagnetic material, or a flexible rolling pin spacer guide made of flexible magnetic, or ferromagnetic material, or made of an elastomer, which shall contain magnetic, or ferromagnetic material.

The rolling pin spacers and rolling pin spacer guides are configured to be magnetically attracted, and removably joined, to each other, and to the top planar rolling surface of the pastry board with enough force to securely hold any required sheeting material such as parchment paper, cutting mat, or template, placed between them.

In order to use the magnetic rolling board, spacers and guides described herein, one can simply knead any pliable material, such as a dough or a compound, on the board's top planer surface. If kneading a non-food pliable material, a liner should be placed between the magnetic material board, and pliable material, or said magnetic pastry board should be only used for non-food materials and clearly labeled as such, or thoroughly decontaminated before use with food products. The same protocol should be applied to all rolling pins, rolling pin spacers, and rolling pin spacer guides as well.

Once the pliable material is ready to be rolled and is removed from the rolling board, an optional template may be placed on top of the rolling surface with its corners tucked into the corner retainers of said pastry board, if applicable. Next an optional cutting mat may be placed over the template and also tucked into said corner retainers. An optional backing sheet may then be placed over the template or cutting mat, such as but not limited to, parchment paper, wax paper, or freezer wrap, that is large enough to cover any magnetic, or magnetically attracted material embedded within the magnetic rolling board.

Once any required sheeting material is in place, the required rolling pin spacer guides and rolling pin spacers are placed along the edges of the rolling surface and on top of any sheeting material. If using the rolling pin spacer guides, they are placed first and at least two of these are used, which are positioned along at least two opposite edges of the rolling surface and on top of the pattern of magnets if available, parallel with each other, having their spacer portions positioned on the inside and toward each other, with the vertical guide sections on the outside edge and away from each other, and placed wide enough apart for an appropriately sized rolling pin to easily roll perpendicular to and between the guide portions, and on top of any rolling pin spacers or the spacer portion of said rolling pin spacer guides. If more height is required, additional rolling pin spacers may be stacked on top of the spacer portion of the rolling pin spacer guides until the desired height above the rolling surface is achieved.

With the required rolling pin spacers and rolling pin spacer guides set in place on top of the rolling surface, the dough, fondant, compound, or the like is placed back on the exposed, or covered, rolling surface and rolled out with an appropriate sized rolling pin. As the material is rolled thinner and thinner, the horizontal rolling pin's cylindrical surface eventually comes in contact with, and rolls on top of, the spacer's top planar surface, thus keeping the roller from flattening the pliable material more than required, resulting in a precisely rolled product.

At this point the pliable material may be further cut and or shaped for a particular application. Such as the pliable material being cut to cookie sheet size, a cookie cutter or knife is used to cut desired shapes, the excess dough is removed leaving the shapes on the rolling surface. The spacers and guides can be removed, the backing sheet may be cut to a manageable size using a sharp blade or scissors, and the backing sheet and processed material may be slid onto an adjacently placed tray for baking, curing, decorating, or any other process.

In addition the magnetic rolling system for pliable material described herein may incorporate adjustable or fixed non-slip feet on its underside, providing a sturdy and non-slip work surface.

A BRIEF DESCRIPTION OF THE SEVERAL VIEWS OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 15 are perspective views of the magnetic rolling system for pliable material in four embodiments thereof.

DETAILED DESCRIPTION OF THE INVENTION

Magnetic rolling systems for pliable material and methods of their use will now be described in detail with reference to the accompanying drawings. It will be appreciated that the systems and methods disclosed herein have wide applicability. For example, the magnetic rolling system for pliable material and methods of its use may be readily employed with a variety of pliable materials such as but not limited to modeling clay, craft compounds such as Sculpey® oven-bake clays from Polyform Products Company of Elk Grove Village, IL, U.S.A., epoxy putty and food materials such as cookie dough, pie crust, cake fondant, and other confectionary delights. Notwithstanding the specific example embodiments set forth below, all such variations and modifications that would be envisioned by one of ordinary skill in the art are intended to fall within the scope of this disclosure.

Figure 1A:
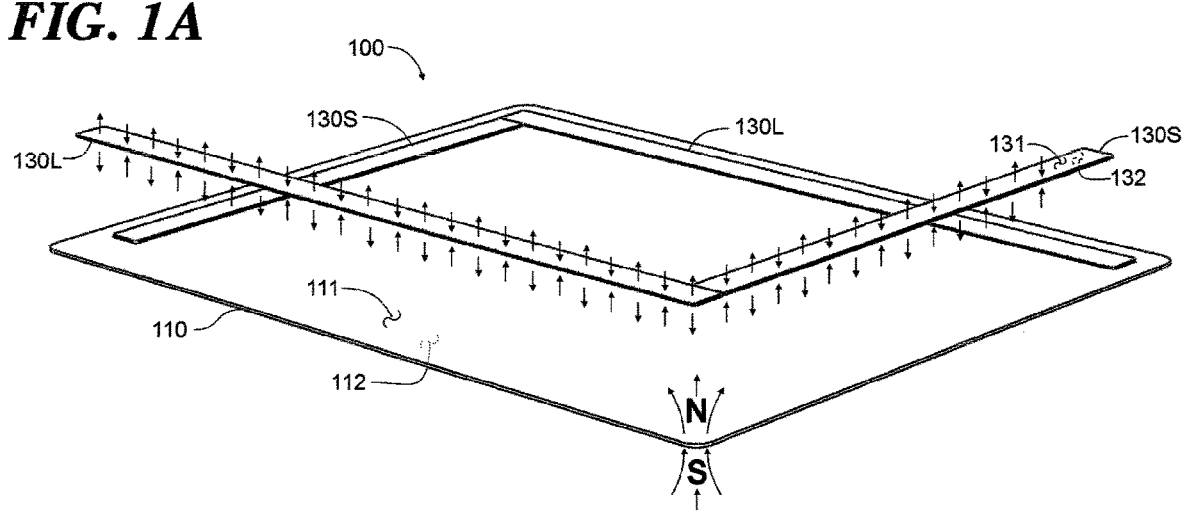
FIGS. 1A, 1B, 1C are perspective views of several examples of the magnetic rolling system for pliable material in its most basic form, a simple rolling board in the form of a thin plate and rolling pin spacers that are magnetically attracted to said plate, and each other.

Referring now to the drawings wherein like reference numerals designates corresponding or similar elements throughout the views herein, FIG. 1A is a perspective view of a magnetic rolling board and rolling pin spacer assembly 100 in plate form, comprising of, magnetic rolling board 110 made of material, such as but not limited to, 16 gauge sheet carbon steel, having a top planar surface 111 and a bottom planar surface 112, and rolling pin spacers 130L whereas the "L" relates to the parallel alignment with the long edges of the rectangular magnetic rolling board 110, and 130S whereas the "S" relates to the parallel alignment with the short edges of said magnetic rolling board 110. Whereas each rolling pin spacer 130L, 130S has a top planar surface 131 and a bottom planar surface 132, and each is long in length but slightly shorter than the edge of the magnetic rolling board on which it sits, narrow in width but usually anywhere from ½" to 1½" wide, but may be narrower or wider as a particular application may require, and thin in thickness similar to the magnetic rolling board 110 in plate form thickness, according to one embodiment of the magnetic rolling system for pliable material. The magnetic rolling board 110 in this embodiment of the magnetic rolling system for pliable material is magnetically attracted to rolling pin spacers 130L, 130S in that the magnetic rolling board 110 is made of a single plate of magnetic or ferromagnetic material that has been magnetically charged while having its north pole on the top side 111 and its south pole on the bottom side 112. The rolling pin spacers 130L, 130S in this embodiment of the magnetic rolling system for pliable material are magnetically attracted to said magnetic rolling board 110, in that said rolling pin spacers 130L, 130S are made of a non-magnetized ferromagnetic material as indicated by the alternating sets of opposing arrows. The two rolling pin spacers 130L, 130S in the foreground are elevated above the top planar surface 111 of magnetic rolling board 110 for ease of distinguishing the different magnetic and non-magnetic properties between them. The two rolling pin spacers 130L, 130S in the background are shown as magnetically attached to the top planar surface 111 of magnetic rolling board 110 in order to illustrate placement of said rolling pin spacers 130L, 130S as proximate and parallel to the edge of the magnetic rolling board 110. However, this configuration would also work if the poles of the magnetic rolling board 110 were reversed with the north pole facing downward and the south pole facing upward. The magnetic rolling board 110 can also be coated or laminated, in part or whole, with paint, epoxy, laminate, or any other material a particular application may require.

Figure 1B:
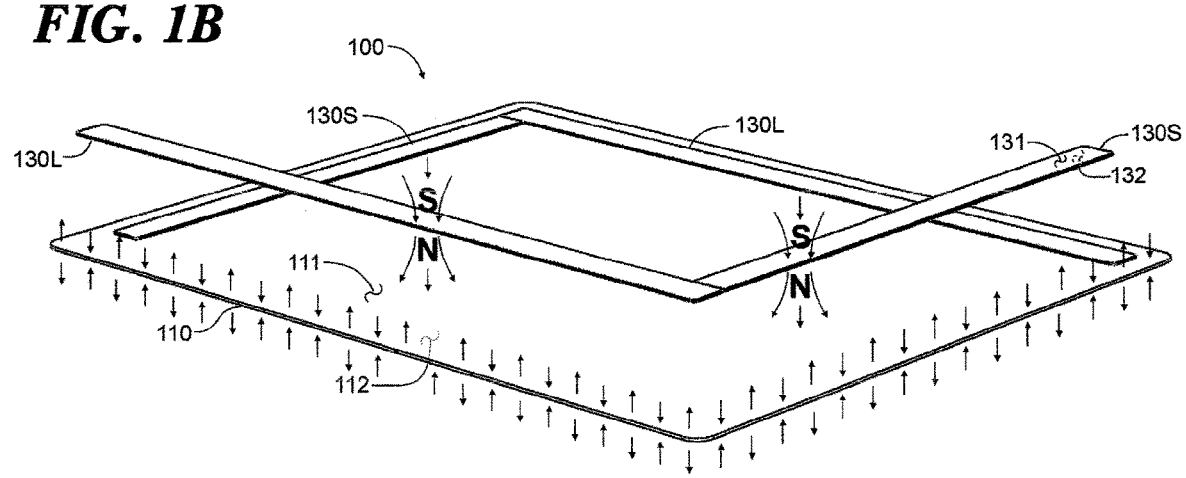

Referring to FIG. 1B, in order to demonstrate that the scope of the magnetic rolling system for pliable material does not dictate any particular orientation or combination of magnetically attracted components, a perspective view of the magnetic rolling board 110, and rolling pin spacer 130L, 130S assembly 100, described herein, is shown in this example with the magnetic properties reversed from FIG. 1A, whereas said rolling pin spacers 130L, 130S are made of a magnetic or magnetized ferromagnetic material with their north poles facing downward, and the magnetic rolling board 110 is made of a non-magnetized ferromagnetic material. The magnetic rolling pin spacers 130L, 130S will function the same if they are flipped over with the north poles facing upward, as both sides of said spacers will attract non-magnetized ferromagnetic material.

Figure 1C:
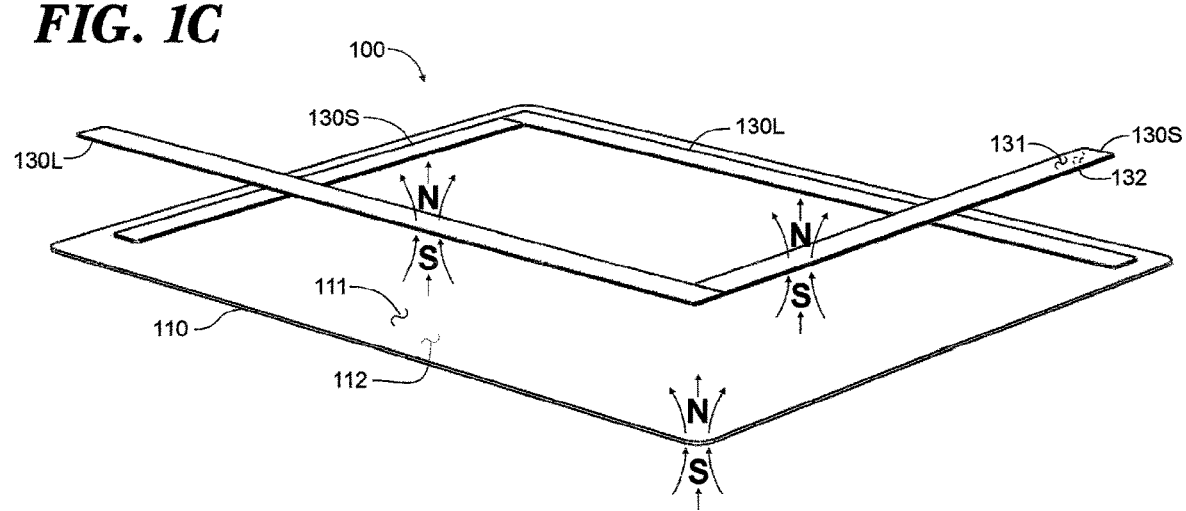

Referring to FIG. 1C, in order to further demonstrate that the scope of the magnetic rolling system for pliable material does not dictate any particular orientation or combination of magnetically attracted components, a perspective view of the magnetic rolling board 110, and rolling pin spacer 130L, 130S assembly 100, described herein, is shown in this example whereas both the magnetic rolling board 110 and rolling pin spacers 130L, 130S are made of a magnetic or magnetized material with their north poles facing upward, but will also function with said magnetic rolling board 110 and rolling pin spacers 130L, 130S inverted provided all poles are facing the same direction.

Figure 2A:
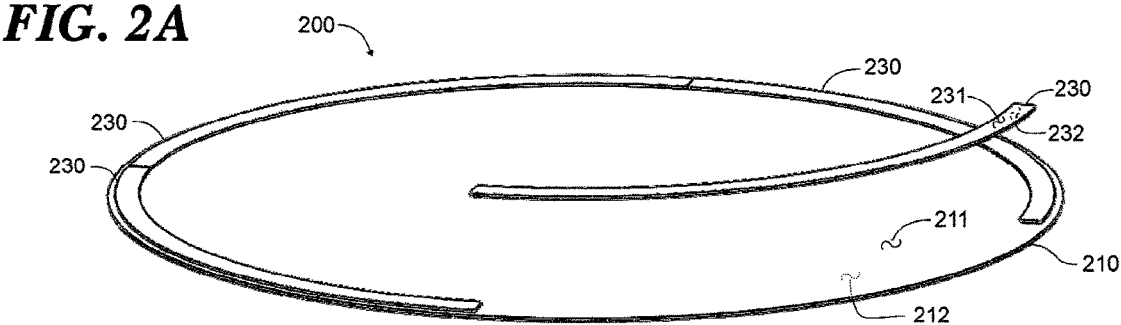
FIGS. 2A, 2B, 2C are perspective views of several examples of the magnetic rolling system for pliable material in a circular form with several types of contoured rolling pin spacers.

Referring to FIG. 2A, whereas most of the other magnetic rolling boards discussed herein have perimeters, or footprints, that are rectangular, any shape, such as but not limited to, a square, circle or oval, may be incorporated into this, or any other embodiment of the magnetic rolling system for pliable material, as a particular application may require. In this embodiment 200 of the magnetic rolling system for pliable material, while the magnetic or ferromagnetic rolling pin spacers 230 which are thin, such as but not limited to 16 gauge sheet carbon steel, and are shaped to follow the contour of, and having an outer perimeter equal to or slightly smaller than the perimeter of the said magnetic or ferromagnetic rolling board's 210 outer edge while usually being anywhere from ½" to 1½" wide, but may be narrower or wider as a particular application may require, and in this example each covers 25 percent of the magnetic or ferromagnetic rolling board's 210 circumference, but may each cover other percentages of the magnetic or ferromagnetic rolling board's 210 circumference with the same or different quantities of magnetic or ferromagnetic rolling pin spacers 230. However, any type, shape, size, or quantity, of magnetic or ferromagnetic rolling pin spacers 230 may be used as a particular application may require for this and any other embodiment of the magnetic rolling system for pliable material.

Figure 2B:
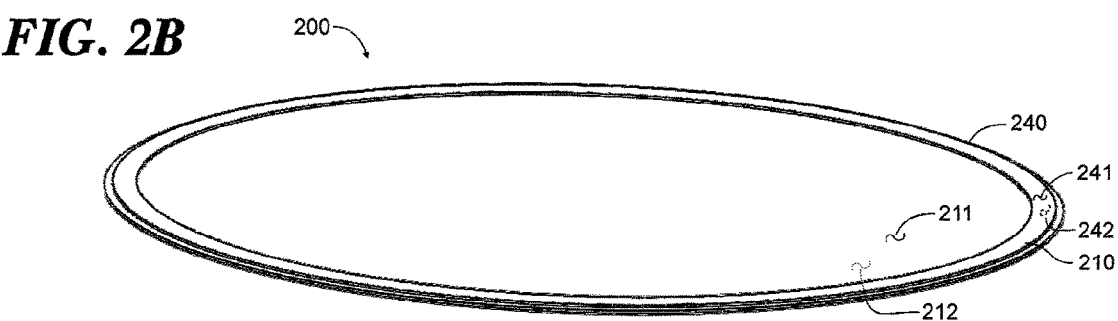

Referring to FIG. 2B, a single circular rolling pin spacer 240 which is thin, such as but not limited to, 16 gauge sheet carbon steel, and is shaped to follow the contour of, and having an outer perimeter equal to, or slightly smaller than, the perimeter of the said magnetic or ferromagnetic rolling board's 210 outer edge, while usually being anywhere from ½" to 1.5" wide, but may be narrower or wider as a particular application may require might be used, and positioned concentric with the magnetic or ferromagnetic rolling board 210, in place of, or in addition to, the multi section rolling pin spacers 230.

Figure 2C:
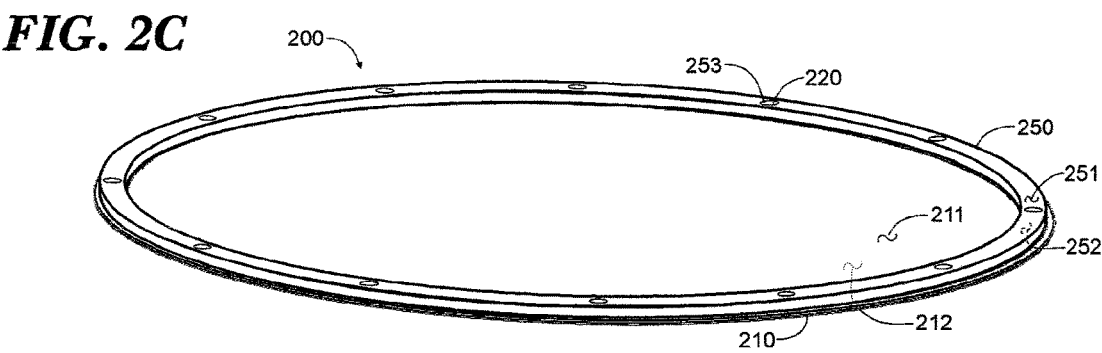

Referring to FIG. 2C, whereas a single rolling pin spacer 250 is thicker than rolling pin spacers 230, 240 being anywhere from ⅛" to ½" thick, but may be thicker or thinner as a particular application may require, but should be thick enough to contain magnetic, or ferromagnetic cylinders 220 set within reliefs 253, as not to protrude from its surface and illustrates how said spacer 250 can be magnetically attracted and attached to, and be used with, the magnetic rolling board 210. While rolling pin spacer 250 is a single all-inclusive circular spacer, a sectional version could be produced similar to rolling pin spacers 230 as well. While the magnetic, or ferromagnetic inserts and reliefs are cylindrical in shape herein, they may be of any shape, size, or type, a particular application, or embodiment, of the magnetic rolling system may require for this and any other rolling pin spacer or rolling pin spacer guide disclosed herein.

Figure 3A:
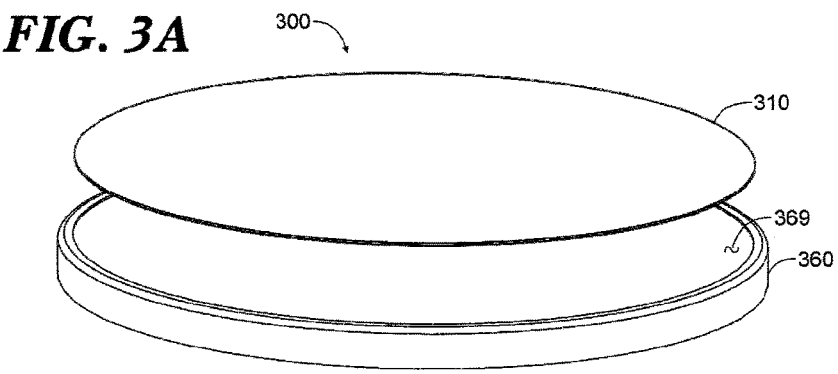
FIGS. 3A, 3B, 3C, 3D are perspective views of several examples of the magnetic rolling system for pliable material in FIGS. 2A, 2B, 2C, mounted on a base, with rolled out pliable material and rolling pin.

Referring to FIG. 3A, whereas in this embodiment 300 of the magnetic rolling system for pliable material, the magnetic or ferromagnetic rolling board 310 is thin, such as but not limited to, 16 gauge sheet carbon steel, and circular in shape, is shown above a circular base 360 having a circular and planar relief 369 formed in its top planar face designed to accommodate said rolling board 310.

Figure 3B:
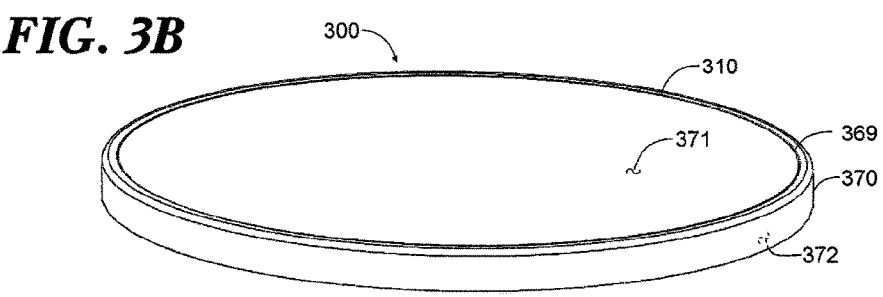

Referring to FIG. 3B, whereas said thin circular magnetic, or ferromagnetic rolling board 310 is inset into relief 369 formed in said circular base 360. Said rolling board 310 and base 360 may be removably or permanently joined together by any means a particular application may require. The circular rolling board 310 and base 360 assembly would now be considered circular magnetic rolling board 370.

Figure 3C:
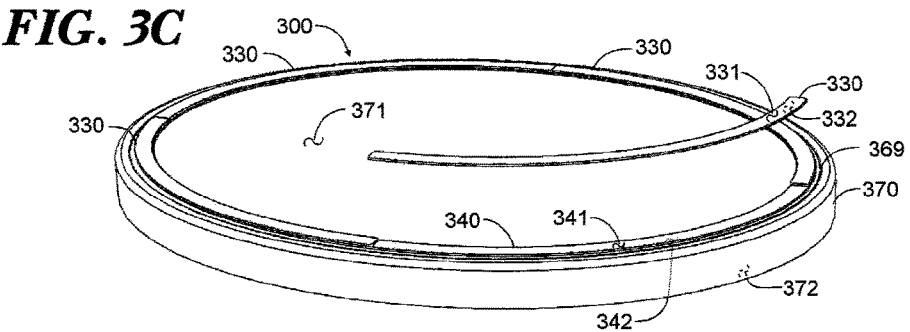

Referring to FIG. 3C whereas curved 330 and circular 340 rolling pin spacers would be used with the circular rolling board 370, wherein this example a single circular rolling pin spacer 340 is placed concentric with, and on the top planar surface 371 of said rolling board 370, while subsequent sectional rolling pin spacers 330 are stacked on top of said circular spacer 340, in order to create a larger gap between the rolling surface 371 and the top planar surface 331 of the rolling pin spacer 330. The rolling board top planar surface 371 and rolling pin spacers 330, 340 are all magnetically attracted to each other by any means discussed herein.

Figure 3D:
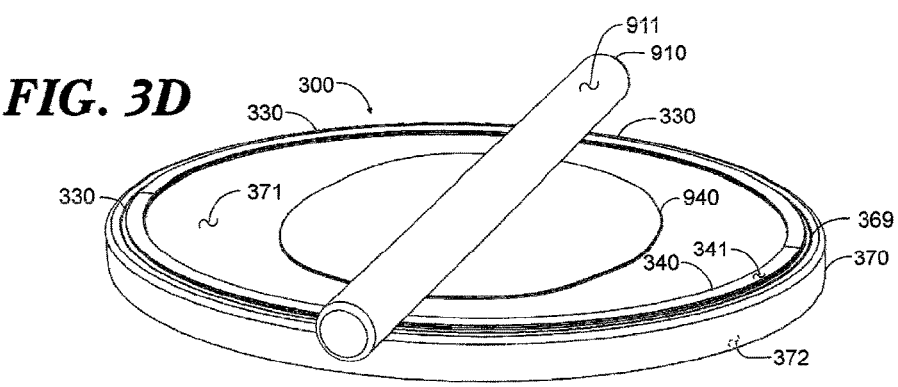

Referring to FIG. 3D whereas pliable material 940, such as but not limited to pastry fondant or clay, is placed centrally on the planar rolling surface 371 of magnetic rolling board 370, and is rolled out using a long thin fondant roller 910. The magnetic or ferromagnetic rolling pin spacers 330, 340 keep said fondant roller's 910 cylindrical surface 911 parallel to, and a specific distance above, the planar rolling surface 371 of the magnetic rolling board 370, the fondant roller 910 is rolled back and forth over the pliable material 940 and rolling pin spacers 330, 340, in turn flattening the rolled material 940 to the same thickness as the total thickness of stacked rolling pin spacers 330, 340.

Figure 4A:
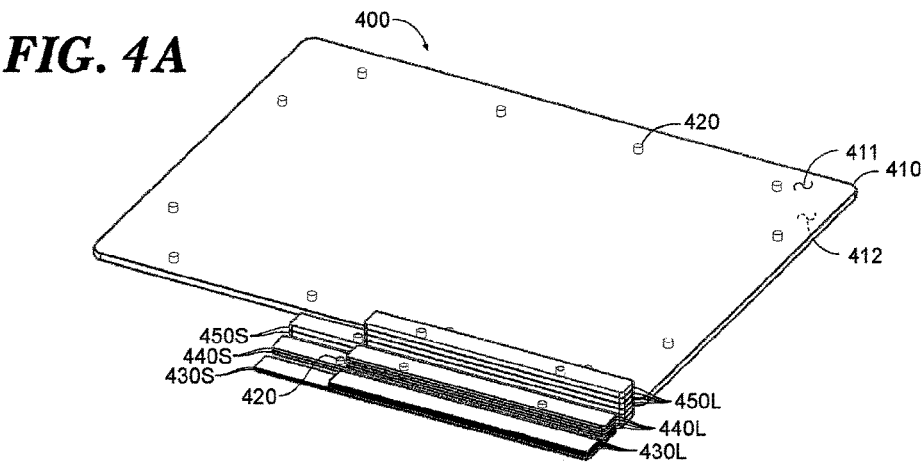
FIGS. 4A, 4B, 4C are perspective views of several examples of the magnetic rolling system for pliable material in a flexible mat form having magnetic or ferromagnetic cylinders embedded within, and rolling pin spacers.
Figure 4B:
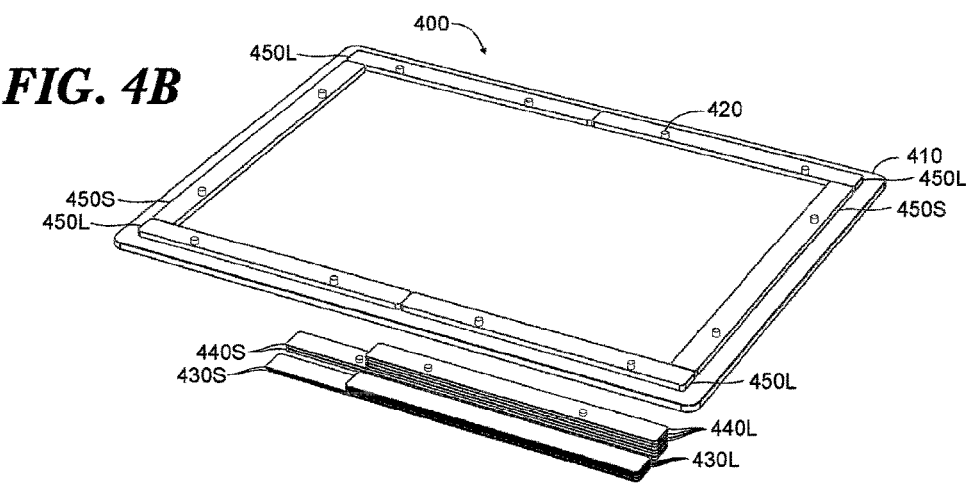

Referring to FIG. 4A whereas this embodiment 400 of the magnetic rolling system for pliable material includes a flexible magnetic rolling mat 410, made of at least one type elastomer or polymer, with magnetic or ferromagnetic cylinders 420, strategically located throughout the flexible magnetic rolling mat 410 in order to align with the magnetic, or ferromagnetic cylinders 420 strategically located throughout the rolling pin spacers 440L, 440S, 450L, 450S. The flexible magnetic rolling mat 410 is typically anywhere from ¼" to ½" thick but may be any thickness a particular application may require, while its largest horizontal dimension is 24" or less, but may be larger as a particular application may require, The magnetic or ferromagnetic cylinders 420 are small enough to be embedded within the flexible magnetic pastry mat 410 and rolling pin spacers 440L, 440S, 450L, 450S, but may be of different sizes based on the thickness of the components in which they are embedded. The thin rolling pin spacers 430L, 430S, are made of a magnetic or ferromagnetic material, such as but not limited to 16 gauge sheet carbon steel, and do not need magnets embedded within. In this example, there are three different thicknesses of rolling pin spacers; ¹⁄₁₆" 430L and 430S, ⅛" 440L and 440S, and ¼" 450L and 450S. However, any thickness and quantity of rolling pin spacers may be used. The rolling pin spacers 430L, 430S, 440L, 440S, 450L, 450S are long in length but slightly shorter than the edge proximate of the magnetic rolling mat of which it sits, and narrow in width, typically anywhere from ½" to 1½" wide, but may be narrower or wider as a particular application may require, Referring to FIG. 4B whereas the ¼" rolling pin spacers 450L and 450S have been placed onto, and magnetically attached to, the flexible magnetic rolling mat 410. These particular rolling pin spacers 450L and 450S have magnetic, or ferromagnetic cylinders 420 strategically located throughout, which are attracted to, and coaxially align with, the magnetic or ferromagnetic cylinders 420 strategically located throughout the flexible magnetic rolling mat 410 which cause the rolling pin spacers 450L and 450S to snap into place. However, in this example, the normally long "L" rolling pin spacers that, in other embodiments of the magnetic rolling system, have been shown as one piece that runs along the length of the magnetic pastry boards, have been cut into two sections for ease of stowage.

Figure 4C:
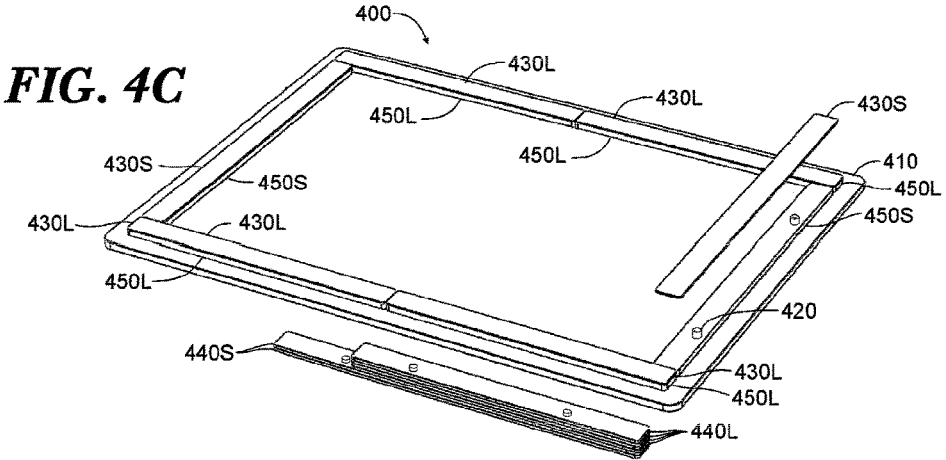

Referring to FIG. 4C whereas, the ¹⁄₁₆" rolling pin spacers 430L, 430S are placed on top of the ¼" spacers 450L, 450S. These particular rolling pin spacers 430L, 430S are made of magnetic or ferromagnetic material, which are attracted to, but do not automatically align with the magnetic, or ferromagnetic cylinders 420 strategically located throughout the rolling pin spacers 450L, 450S and must be manually aligned. This now brings the total height of the spacers 430L, 430S, 450L, 450S magnetically attached to the flexible magnetic rolling mat 410, to 5/16".

Figure 5A:
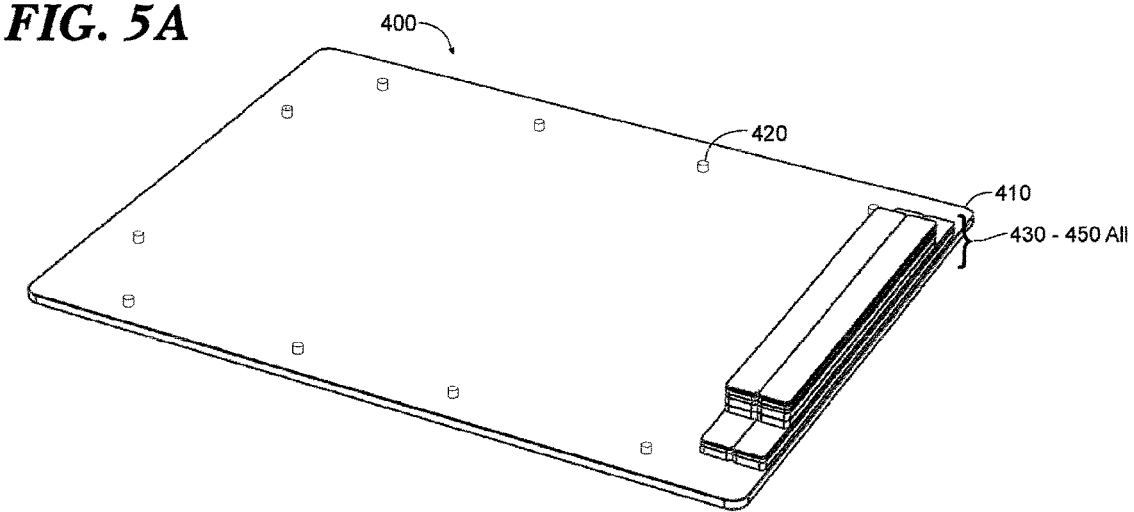
FIGS. 5A, 5B are perspective views of several examples of the magnetic rolling system for pliable material in a flexible mat form where the spacers are stacked and placed along a short edge of said flexible mat and rolled up for compact stowage.

Referring to FIG. 5A whereas, the typically long "L" rolling pin spacers depicted in other embodiments described herein are shortened to half their length and the quantities doubled, these shorter long edge rolling pin spacers 430L, 440L, 450L can now be stacked up along a short edge of the flexible magnetic pastry mat 410 without hanging off the edges.

Figure 5B:
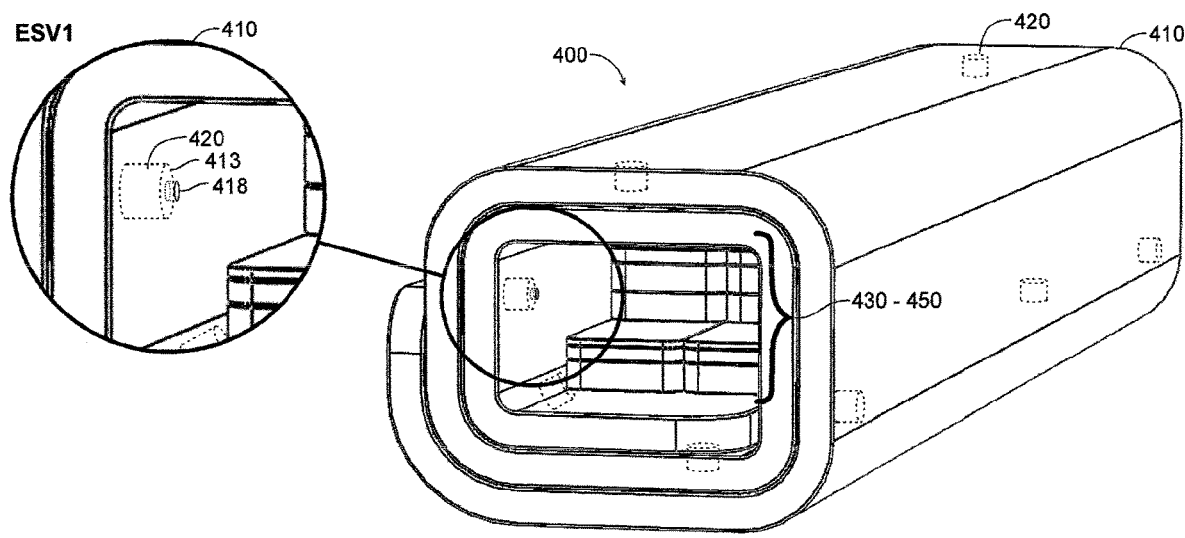

Referring to FIG. 5B whereas, all the rolling pin spacers 430L, 430S, 440L, 440S, 450L, 450S, have been placed along a short edge of the flexible magnetic pastry mat 410, they can all be rolled up into a convenient self-contained package 401. Additional magnetic or ferromagnetic cylinders 420 can be embedded into the loose end of the rolled up mat 410, and elsewhere within, in order to keep it magnetically secured to itself and help prevent unintentional unrolling. The flexible magnetic rolling mat 410 can be molded with said cylinders 420 completely encased within, or a cavity 413 and small access hole 418 can be formed into the flexible magnetic rolling mat 410 so that the magnetic, or ferromagnetic cylinders 420 can be removably inserted after the flexible magnetic rolling mat 410 is molded, as shown in the enlarged sectional view ESV1. While the magnetic, or ferromagnetic cylinders 420 and reliefs are cylindrical in shape herein, they may be of any shape, size, or type, a particular application may require for any embodiment of the magnetic rolling system for pliable material. Alternately, the flexible magnetic pastry mat 410 could be made of a thin magnetic flexible sheet material, such as but not limited to, vehicle or refrigerator graphics magnets. This would eliminate the need to embed magnetic or ferromagnetic cylinders 420 into the flexible magnetic rolling mat 410.

Figure 6:
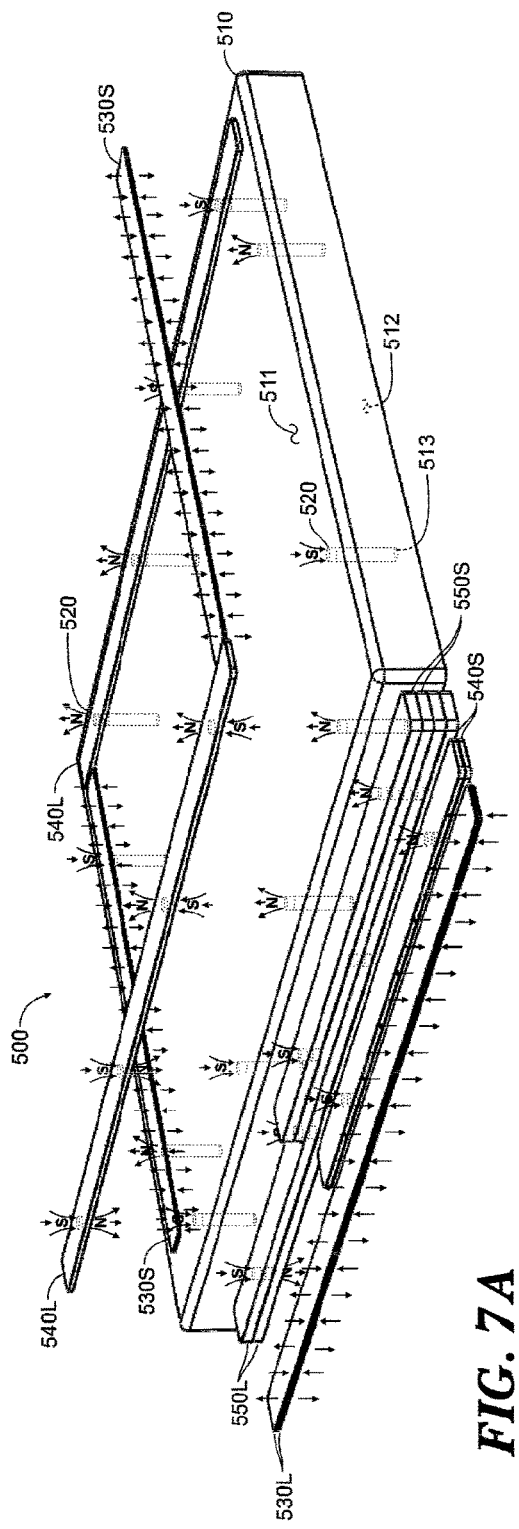
FIG. 6 is a perspective view of the magnetic rolling system for pliable material in another embodiment of the magnetic rolling board, and rolling pin spacers.

Referring to FIG. 6 whereas, in this embodiment 500 of the magnetic rolling system for pliable material, additional methods of creating a magnetic attraction between a magnetic rolling board 510 and rolling pin spacers 530L, 530S, 540L, 540S, 550L, 550S, where said magnetic rolling board 510 is typically anywhere from ½" to 2" thick but may be any thickness a particular application may require, while its largest horizontal dimension is 24" or less, but may be larger as a particular application may require, and is made of a rigid material, such as but not limited to, plastic, wood, or composite. Rolling pin spacers 530L, 530S, 540L, 540S, 550L, 550S, are made of a rigid material, such as but not limited to, plastic, wood, or composite, and are shown whereas at least one portion, of each component is magnetically charged or attracted to the other. In this example, a number of cylindrical magnet reliefs 513, which may be of any shape a particular application may require, are vertical cylindrical channels formed, perpendicular to, and from a bottom planar surface 512 of said rolling board 510, to just below a top planar surface 511, which is typically between 1/32" to 1/8" from said top planar surface 511, but may be any distance a particular application may require, where cylindrical magnets 520, which may be of any shape a particular application may require, are inserted up through the open end and to the top of said cylindrical magnet reliefs 513, and are bonded or mechanically held in place. Cylindrical magnet reliefs 513 are located along and inside the outer perimeter of said rolling board 510, but not tangent to or through the outer perimeter edge of said rolling board 510, so that the cylindrical walls encompass 360° of said cylindrical reliefs 513. Cylindrical magnet reliefs 513 may then be backfilled with any suitable material as an alternate to being bonded or mechanically held in place. Said cylindrical magnet reliefs 513 and cylindrical magnets 520 that would not be visible from this view are represented by thin dashed lines.

These cylindrical magnets 520 are further designated with north and south poles indicated by the letters "N" and "S" respectively and where practical, including magnetism flow directional arrows, while non-magnetized ferromagnetic material is represented by alternating sets of opposing arrows. Once in place, the cylindrical magnet's 520 magnetic field, N or S, is able to penetrate the thin layer of material at the top planar surface 511 of said rolling board 510 and attract any other magnetic or ferromagnetic material placed on top of said planar surface 511. This image also illustrates that all the cylindrical magnets 520 do not need to be facing the same direction. For example, the long rolling pin spacers 540L, 550L each have two cylindrical magnets 520 orientated opposite the remaining two magnets 520. This might be useful when proper orientation of rolling pin spacers 540L, 550L is an issue, where for instance, there could be a lip overhand along an outer edge of a spacer to aid in lifting it off a magnetic pastry board. While the cylindrical magnets 520 are shown in opposing orientations, they could all be facing the same direction, as another application may require. Another option not shown, would be for any of the cylindrical magnets 520 to be replaced with a non-magnetized ferromagnetic cylinder that would be attracted to the magnets in a mating component. This would be helpful in reducing the number of magnets 520 required, however these less costly non-magnetized ferromagnetic cylinders would not be able to attract the non-magnetized ferromagnetic rolling pin spacers 530L, 530S. While this image depicts two different thickness between rolling pin spacers 530S, 540L magnetically attached to the top planar surface 511 of said rolling board 510 in order to demonstrate magnetic relationships between the components, typically, each layer of rolling pin spacers would be of the same thickness.

Referring to FIGS. 7A-7E whereas, cross sectional views of core sample 560 of magnetic rolling board 510 show just some examples of the many possible ways in which a magnetic or ferromagnetic cylinder 520 might be embedded within said magnetic rolling board 510. However any method may be used in order to embed said cylinders 520 within said magnetic rolling board 510, as well as any other applicable embodiment of a magnetic rolling board discussed herein, as a particular application may require.

Figure 7A:
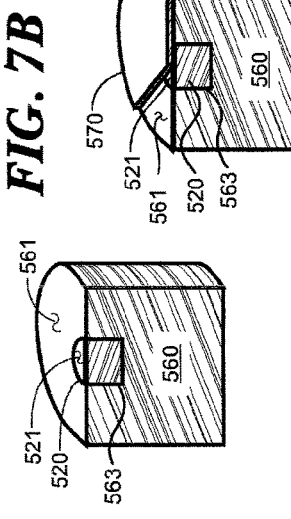
FIGS. 7A, 7B, 7C, 7D, 7E are perspective views of the magnetic rolling system for pliable material whereas some examples of how a magnetic or ferromagnetic cylinder might be embedded in a magnetic rolling board are shown.

Referring to FIG. 7A whereas, a magnetic, or ferromagnetic cylinder 520 could be overmolded into, or set into a relief 563 formed into, the top planar surface 561 of core sample 560. This configuration would provide the strongest magnetic attraction option, however, the face 521 of said magnetic, or ferromagnetic cylinder 520 would be exposed to the elements and wear. In addition, any exposed magnetic, or ferromagnetic cylinders 520 may, or may not, be seen as esthetically pleasing. Alternately, the top planer surfaces of core sample 561, face 521 could be coated and protected with a paint, varnish, polymer, epoxy, or any other coating or coatings a particular application may require.

Figure 7B:
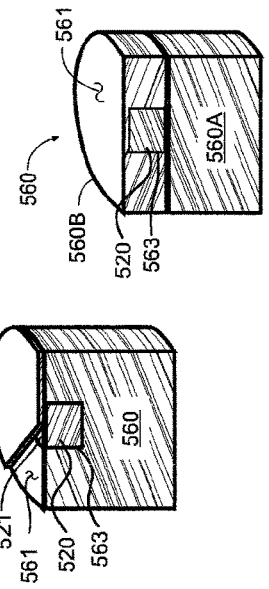

Referring to FIG. 7B whereas, a magnetic, or ferromagnetic cylinder 520 could be overmolded into, or set and bonded into a relief 563 formed into, the top planar surface 561 of core sample 560. The top planar surface 521 of magnetic, or ferromagnetic cylinder 520 and top planar surface 561 could be covered with at least one laminate sheet 570, which is cut away in this view in order to expose top planar surface 521 and top planar surface 561, and is made of any material or materials, and durometer a particular application may require, such as but not limited to, wood or plastic, and is typically between 1/32" to 1/8" thick, but may be any thickness a particular application may require, where core sample 560 and laminate sheet 570 would be bonded, or mechanically fastened, together.

Figure 7C:
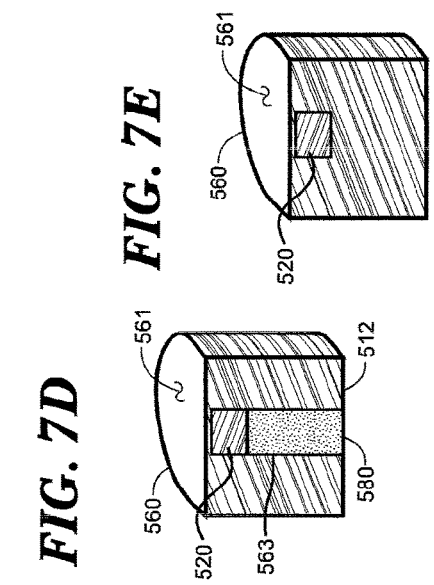

Referring to FIG. 7C whereas, magnetic rolling board core sample 560 could be made of at least one lower section 560A and at least one upper section 560B, with at least one relief 563 formed into the underside of the upper section 560B, which is typically between 1/32" to 1/8" from the top planar surface 561, but may be any distance a particular application may require, into which a magnetic, or ferromagnetic cylinder 520 can be inserted, and bonded if need be. The lower section 560A and upper section 560B are then bonded or mechanically fastened together.

Figure 7D:
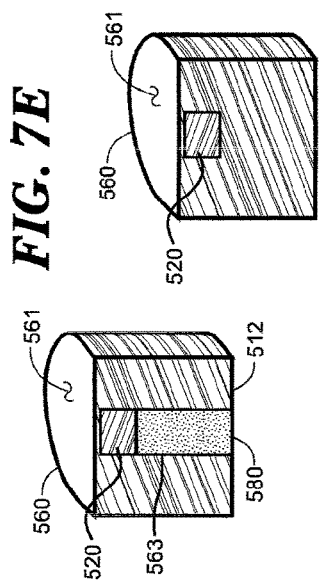

Referring to FIG. 7D whereas, at least one cylindrical magnet relief 563 comprising a vertical cylindrical channel that is formed, perpendicular to, and from said bottom planar surface 512 of core section 560 to just below a top planar surface 561, which is typically between 1/32" to 1/8" from said top planar surface 561, but may be any distance a particular application may require, where a magnetic, or ferromagnetic cylinder 520 is inserted up to the top of cylindrical magnet relief 563 and bonded, or mechanically fastened in place, and may be additionally, or alternately, backfilled with any suitable material 580.

Figure 7E:
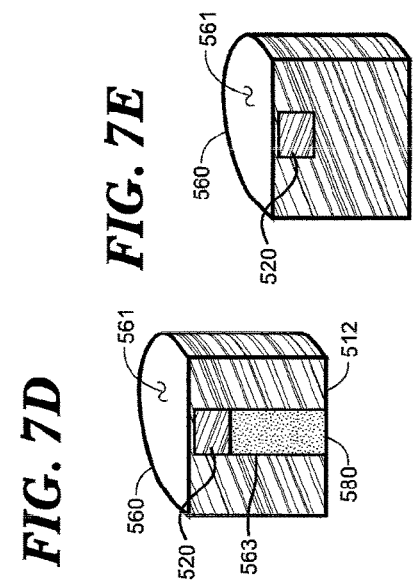

Referring to FIG. 7E whereas, in this embodiment of the magnetic rolling system for pliable material, at least one magnetic, or ferromagnetic cylinder 520 could be molded into core section 560 near its top planar surface 561, which is typically between 1/32" to 1/8" from said top planar surface 561, but may be any distance a particular application may require.

Referring to FIGS. 8A-8F whereas, in this embodiment 500 of the magnetic rolling system for pliable material, sectional views of rolling pin spacer 550L show just some examples of the many possible ways a magnetic or ferromagnetic cylinder 520 might be embedded within a sample section of a rolling pin spacer 550L, or any other rolling pin spacers and rolling pin spacer guides. However any method may be used in order to embed any type, size or shape magnetic or ferromagnetic component within any applicable type, size, or shape rolling pin spacer or rolling pin spacer guide, and any other embodiment of the magnetic rolling system for pliable material, as a particular application may require.

Figure 8A:
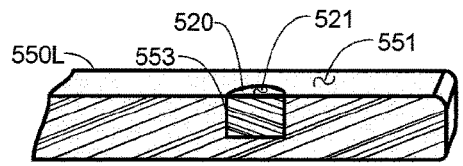
FIGS. 8A, 8B, 8C, 8D, 8E, 8F are perspective views of the magnetic rolling system for pliable material whereas some examples of how a magnetic or ferromagnetic cylinder might be embedded in a rolling pin spacer are shown.

Referring to FIG. 8A whereas, at least one magnetic, or ferromagnetic cylinder 520 could be overmolded into, or set into at least one relief 553 formed into, the top planar surface 551 of rolling pin spacer section 550L. This configuration would provide the strongest magnetic attraction option, however, top planar surface 521 of said magnetic, or ferromagnetic cylinder 520 would be exposed to the elements and wear. In addition, the exposed top planar surface 521 may, or may not, be seen as esthetically pleasing. Alternately, the outer surfaces 551, 521 could be coated with a paint, varnish, polymer, epoxy, or any other coating, or coatings, a particular application may require.

Figure 8B:
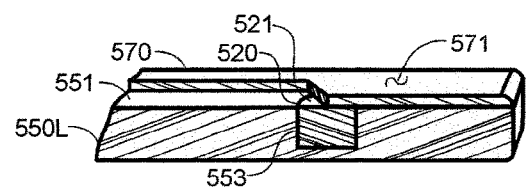

Referring to FIG. 8B whereas, at least one magnetic, or ferromagnetic cylinder 520 could be overmolded into, or set into at least one relief 553 formed into, the top planar surface 551 of rolling pin spacer section 550L. The top planar surface 521 of magnetic, or ferromagnetic cylinder 520 and top planar surface 551 of rolling pin spacer 550L could be covered with at least one laminate sheet 570 made of any, material or materials, thickness, and durometer a particular application may require, such as but not limited to, wood or plastic, and is typically between 1/32" to 1/8" thick, but may be any thickness a particular application may require, where rolling pin spacer section 550L and laminate sheet 570 would be bonded, or mechanically fastened, together.

Figure 8C:
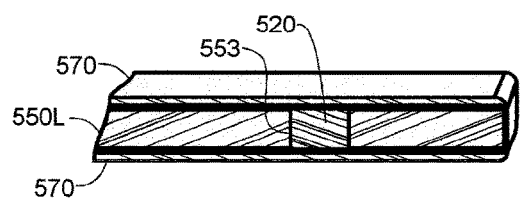

Referring to FIG. 8C whereas, the magnetic, or ferromagnetic cylinder 520 is set into thru hole relief 553 so that both its planar surfaces are flush with the top and bottom planar surfaces of rolling pin spacer section 550L, where they are sandwiched between two laminate sheets 570 which are securely bonded, or mechanically secured, to said rolling pin spacer section 550L. Laminate sheets 570 are made of any material, or materials, and durometer a particular application may require, such as but not limited to, wood or plastic, and is typically between 1/32" to 1/8" thick, but may be any thickness a particular application may require.

Figure 8D:
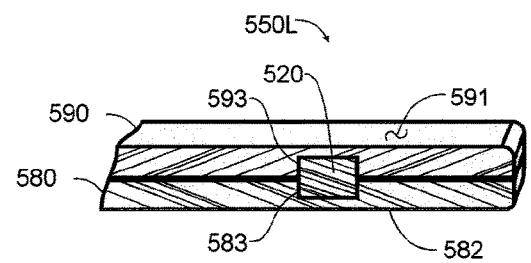

Referring to FIG. 8D whereas a rolling pin spacer 550L could be made of at least one lower section 580 and at least one upper section 590, with at least one relief 583 formed into said lower section 580 mating surface and at least one relief 593 formed into said upper section 590 mating surface, where said reliefs 583, 593, which are typically between 1/32" to 1/8" from their respective planar surfaces 582, 591 but may be any distance a particular application may require, and coaxial in alignment, into which a magnetic, or ferromagnetic cylinder 520 can be set. Said two sections 580, 590 of the rolling pin spacer 550L are then bonded, or mechanically fastened, together.

Figure 8E:
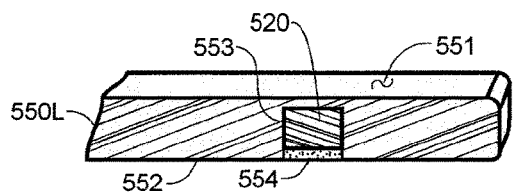

Referring to FIG. 8E whereas a cylindrical relief 553 is formed from the bottom planar surface 552 of the rolling pin spacer section 550L to just below its top planar surface 551, which is typically between 1/32" to 1/8" from the planar surfaces 551, but may be any distance a particular application may require, where a magnetic, or ferromagnetic cylinder 520 is inserted up to the top of said relief 553 and bonded, or mechanically fastened in place, and may be additionally, or alternately backfilled, with any suitable material 554.

Figure 8F:
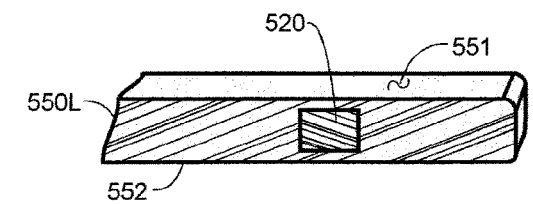

Referring to FIG. 8F whereas, at least one magnetic, or ferromagnetic cylinder 520 could be molded into a rolling pin spacer 550L, between its top 551 and bottom 552 planar surfaces.

Figure 9A:
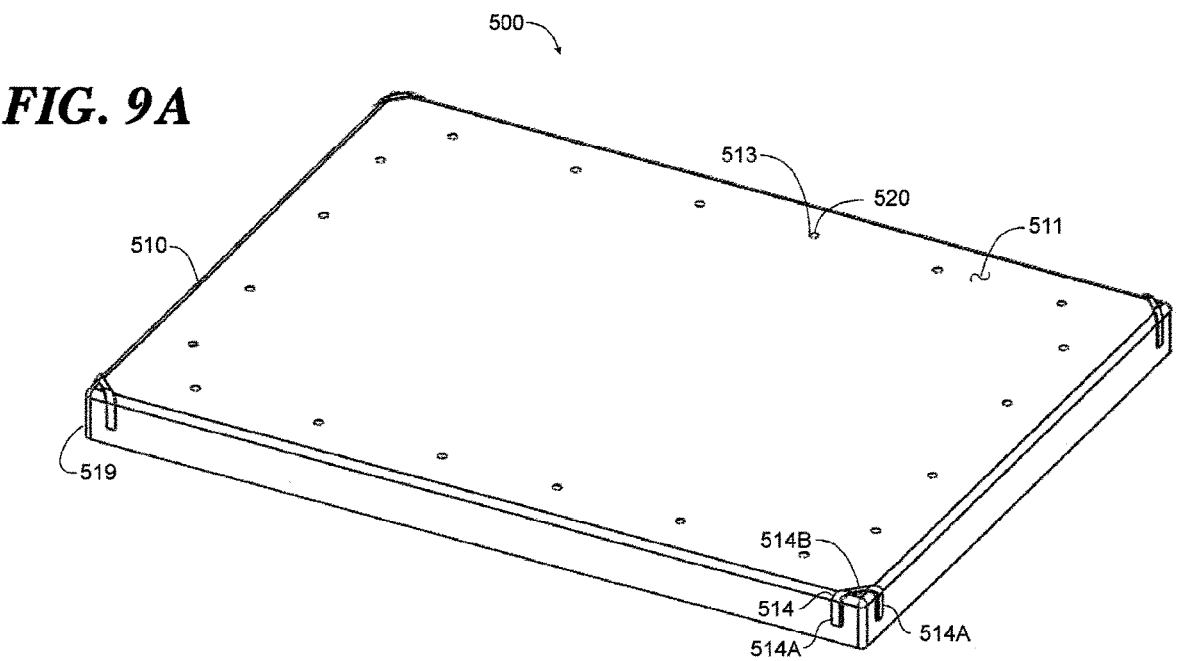
FIG. 9A, 9B are perspective views of another embodiment of the magnetic rolling system for pliable material whereas, magnetic or ferromagnetic cylinders are set in magnet reliefs formed into the top planar surface and strategically located throughout a thicker magnetic rolling board. Corner retainers and feet are visible as well.

Referring to FIG. 9A whereas, in this embodiment 500 of the magnetic rolling system for pliable material, the magnetic rolling board 510 which is typically anywhere from 1/2" to 2" thick, but may be any thickness a particular application may require, while its largest horizontal dimension is 24" or less, but may be larger as a particular application may require, which is made of a rigid material such as but not limited to plastic, wood, or composite, an optional means for securely holding any sheet templates or board protectors in place at, at least two opposing corners 519 of the magnetic rolling board 510, in the form of corner retainers 514 which could be made of a rigid material, such as but not limited to, brass, or plastic. These corner retainers 514 could be held in place mechanically by any means, such as but not limited to, brads or screws, or bonded thermally or chemically, whereas both vertical members 514A of corner retainers 514 are joined to the intersecting edges of the magnetic rolling board 510, and the horizontal portion 514B of retainer 514 is raised slightly above the planar surface 511 of magnetic rolling board 510, just enough for several sheets of material to easily fit between the planar surface 511 of magnetic rolling board 510, and the horizontal portion 514B of retainer 514. Additionally a plurality of magnetic, or ferromagnetic cylinders 520 could be overmolded into, or set and bonded into reliefs 513 formed into, the top planar surface 511.

Figure 9B:
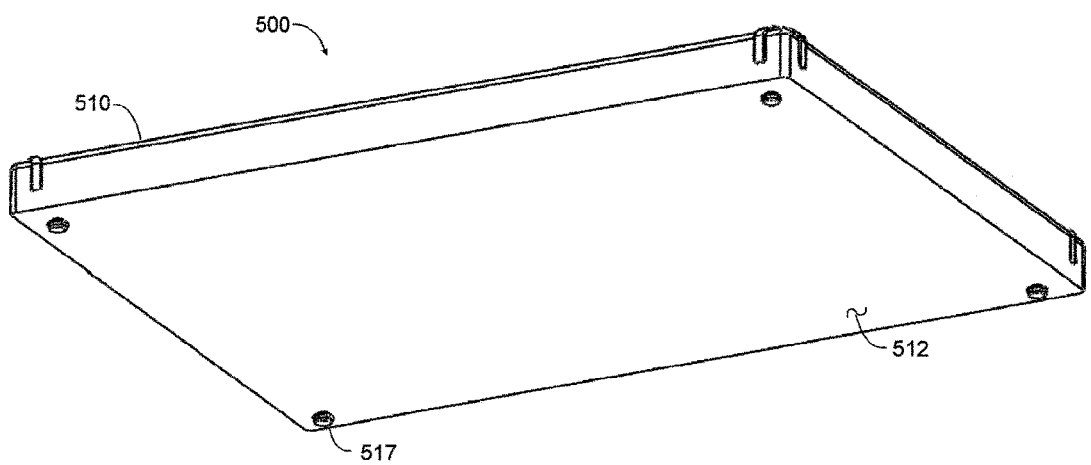

Referring to FIG. 9B whereas, a lower perspective view of the magnetic rolling board 510 described herein affords a clear view of the fixed or adjustable non-skid feet 517 which may be of any materials, shape, and size, are set into, screw into, or bonded, or otherwise joined by any other means as a particular application may require, to the lower planar face 512 of the magnetic rolling board 510.

Figure 10A:
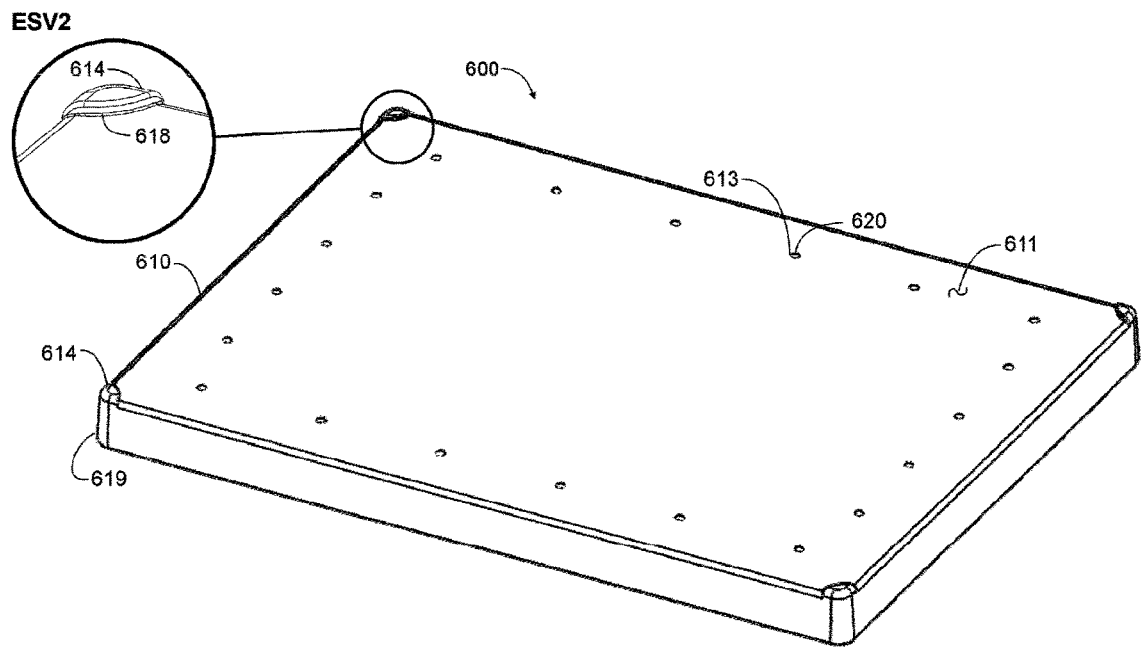
FIG. 10A, 10B are perspective views of the magnetic rolling system for pliable material in yet another embodiment whereas, magnetic or ferromagnetic cylinders are set in magnet reliefs formed into the top planar surface and strategically located throughout a shelled out magnetic rolling board. Corner retainers, structural ribbing, foot bosses, and feet are visible as well.

Referring to FIG. 10A whereas, in this embodiment 600 of the magnetic rolling system for pliable material, a perspective view of the magnetic rolling board 610 is shown which is typically anywhere from ½" to 2" thick, but may be any thickness a particular application may require, while its longest horizontal dimension is 24" or less, but may be longer as a particular application may require, and is made of a rigid material, such as but not limited to, plastic, metal, or composite. In this perspective view, a top planer surface 611 has a plurality of magnetic, or ferromagnetic cylinders 620 located around the perimeter of said magnetic rolling board 610 where said magnetic, or ferromagnetic cylinders 620 are either overmolded into, or set and bonded into, an equal number of cylindrical magnet wells 613. Cylindrical magnet wells 613 are vertical cylindrical channels designed to encompass the entirety of said magnetic, or ferromagnetic cylinders 620 on all sides while having bottom planar surfaces for said magnetic, or ferromagnetic cylinders 620 to rest on and to position said magnetic, or ferromagnetic cylinders 620 top surface flush with, or just below, said top planer surface 611. Cylindrical magnet wells 613 are formed into, and perpendicular to, said top planer surface 611 and designed to receive said magnetic, or ferromagnetic cylinders 620. Optional sheet corner retainers 614 are located at each of the four corners 619 and are more easily viewed in enlarged sectional view ESV2. Unlike the corner retainers 514 that were designed as separate components and would need to be assembled to the magnetic rolling board 510 in FIGS. 9A, 9B, the corner retainers 614 in this embodiment 600 of the magnetic rolling system for pliable material, are formed as integral features of the magnetic rolling board 610, eliminating the need for assembly of this feature. The raised corner retainers 614 provide a slot 618 through which corners of liner and template sheet material can be inserted helping to keep them in place.

Figure 10B:
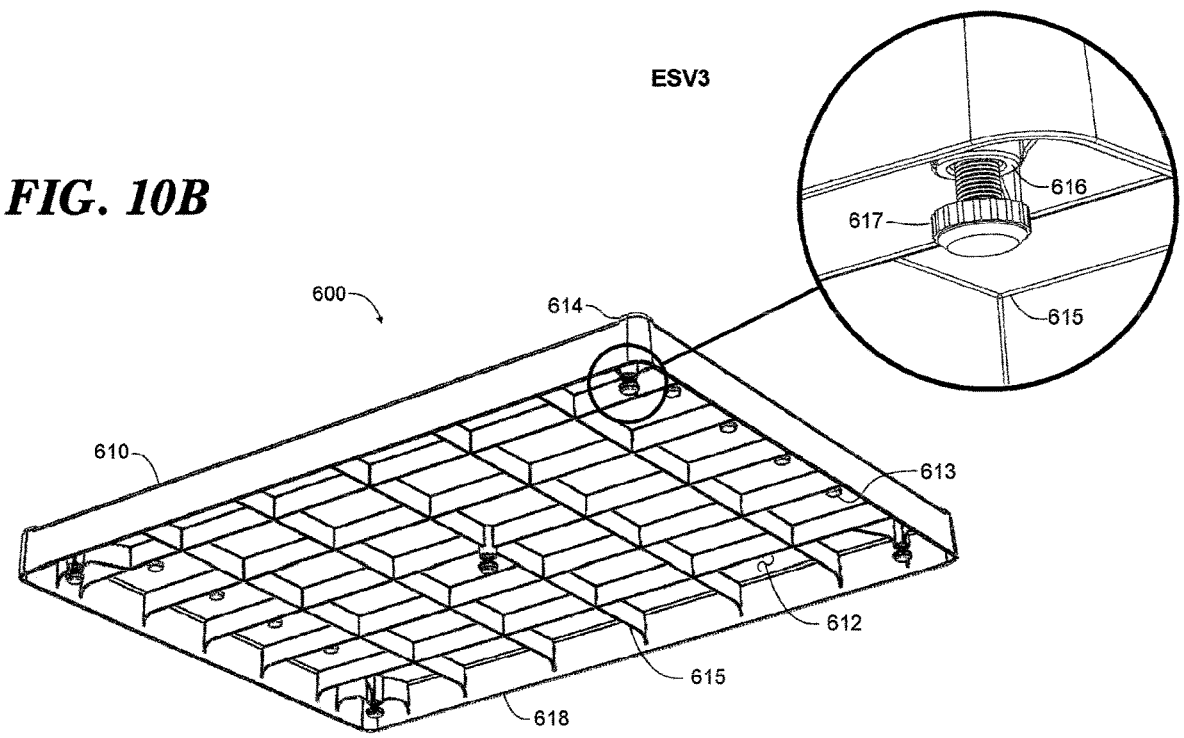

Referring to FIG. 10B whereas, a lower perspective view of the magnetic rolling board 610 and it's shelled out underside 612 described herein is shown with an enlarged sectional view ESV3. This perspective view reveals the structural ribbing pattern 615 which is shown as an example only and may be of any configuration a particular application may require, while the cylindrical magnet wells 613 located around the perimeter of the magnetic rolling board 610 are also visible. While said magnetic, or ferromagnetic cylinders 620 are inserted into cylindrical magnet wells 613 through the top planar surface 611 of the magnetic rolling board 610, alternately magnetic, or ferromagnetic cylinders 620 could be inserted into said cylinder wells 613 from the shelled out bottom side 612, similar to the cylinder wells 633, 643, 653 on the shelled out bottom side 632, 642, 652 of rolling pin spacers 630S, 640S and rolling pin spacer guide 650S shown in FIG. 11B, provided the open side of the cylinder reliefs 613 face downward.

ESV3 depicts optional fixed or adjustable non-skid foot 617, and optional foot boss 616 which optional fixed or adjustable non-skid foot 617 screws into, or is otherwise removable or permanently set into. If using an adjustable threaded foot 617, said boss 616 may be threaded, or a threaded insert may be installed at any appropriate point during the fabrication process. Any number or type of feet and bosses or other foot attachment means may be incorporated into the design, or alternately, said optional foot bosses 616, and optional fixed or adjustable non-skid feet 617 could be eliminated and said magnetic rolling board 610 could rest on its outer wall's bottom edges 618.

Figure 11A:
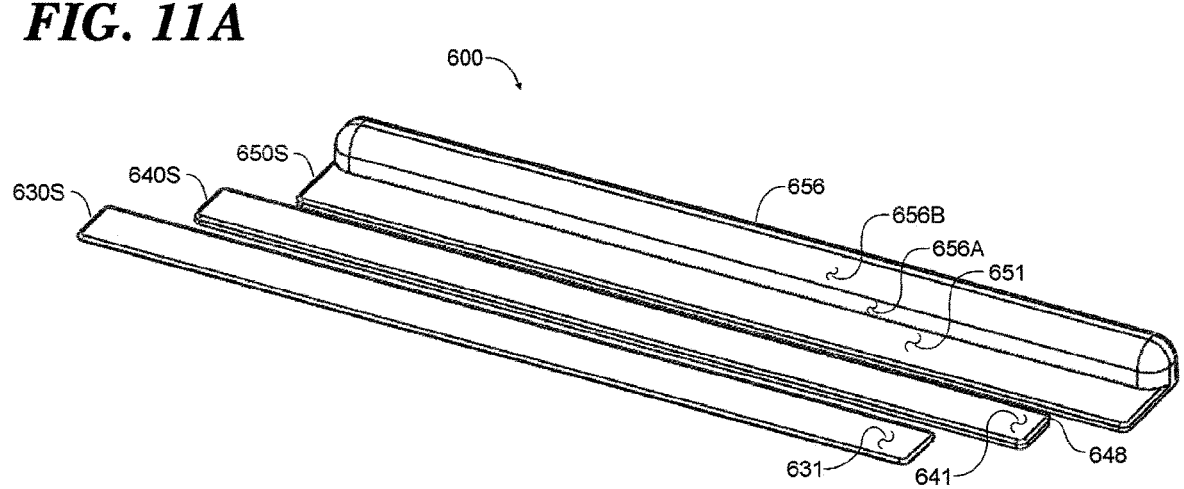
FIG. 11A, 11B, 11C are perspective and end views of one embodiment of the rolling pin spacers and rolling pin spacer guides described herein.

Referring to FIG. 11A whereas a perspective view of the three shorter rolling pin spacers 630S, 640S and rolling pin spacer guide 650S are shown. The components in this figure are as follows from left to right; the 1/16" thick short rolling pin spacer 630S, the ⅛" thick short rolling pin spacer 640S, and the ⅛" thick short rolling pin spacer guide 650S, however the thickness of these rolling pin spacers and guide are an example only and may be of any thickness a particular application may require. The features illustrated in this view are the top planar surfaces 631, 641, 651, the edge lip 648, the rolling pin guide 656, guide inner face 656A, and guide inner face radius 656B. The short spacers 630S, 640S and guide 650S are shown in this example for ease of viewing, while the longer rolling pin spacer guides 630L, 640L, 650L are identical except for their longer length, and a greater quantity of magnetic, or ferromagnetic cylinders 620, where said cylinders 620 are incorporated into the design. However, any type, shape, size, or quantity, of spacers and guides may be used as a particular application may require for this and any other embodiment of the present invention.

Figure 11B:
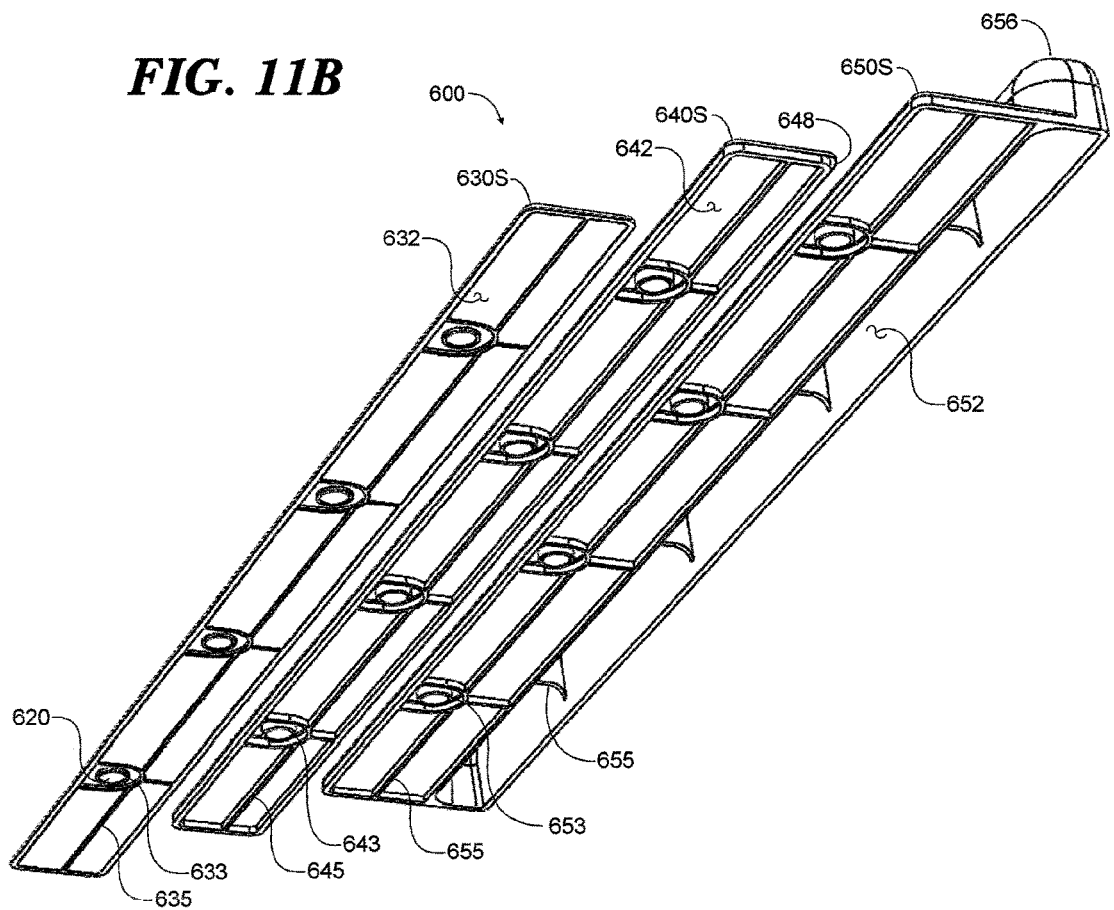

Referring to FIG. 11B whereas a lower perspective view of the three shorter rolling pin spacers 630S, 640S and rolling pin spacer guide 650S are shown. The components in this figure are as follows from left to right; the 1/16" thick short rolling pin spacer 630S, the ⅛" thick short rolling pin spacer 640S, and the ⅛" thick short rolling pin spacer guide 650S. The features illustrated in this view of the rolling pin spacers 630S, 640S and rolling pin spacer guide 650S are, the shelled out undersides 632, 642, 652, the structural ribbing 635, 645, 655, the cylinder wells 633, 643, 653, the magnetic, or ferromagnetic cylinders 620, and the edge lip 648. The structural ribbing pattern 635, 645, 655 shown is an example only and may be of any configuration a particular application may require. The magnetic, or ferromagnetic cylinders 620 are either overmolded into, or inserted and bonded into, cylinder wells 633, 643, 653, from the bottom of the rolling pin spacers 630S, 640S and rolling pin spacer guide 650S. Alternately the magnetic, or ferromagnetic cylinders 620 could be inserted into cylinder wells 633, 643, 653 through the top planar surfaces 631, 641, 651, similar to the magnet wells 613 on the top planar surface 611 of the magnetic rolling board 610 in FIGS. 10A, 10B.

Figure 11C:
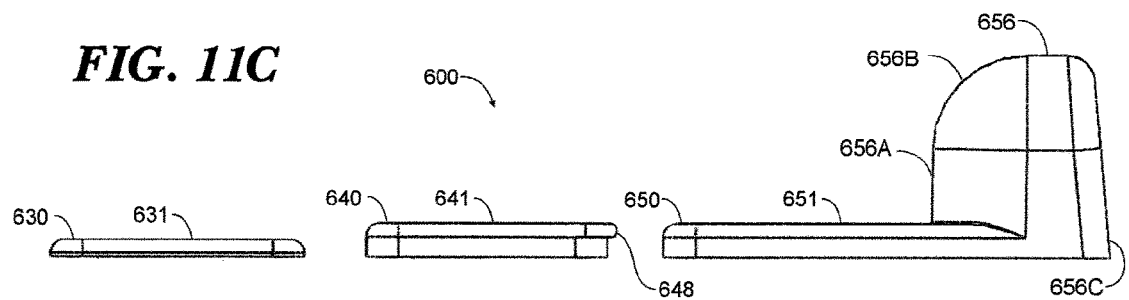

Referring to FIG. 11C whereas, an end plan view of the three shorter rolling pin spacers 630S, 640S and rolling pin spacer guide 650S are shown. The components in this figure are as follows from left to right; the 1/16" thick short rolling pin spacer 630S, the ⅛" thick short rolling pin spacer 640S, and the ⅛" thick short rolling pin spacer guide 650S. The features shown in this view are the top planar surfaces 631, 641, 651, edge lip 648, rolling pin guide 656, rolling pin guide inner face 656A, rolling pin guide inner face radius 656B, and rolling pin guide outer face 656C.

Referring to FIGS. 12A-12E whereas, in this embodiment 600 of the magnetic rolling system for pliable material, a series of images are shown in order to illustrate how to roll out pliable materials such as cookie dough, pie crust, and fondant, as well as, modeling clay, craft compounds, and epoxy putty, using the magnetic rolling board 610 and rolling pin spacers 630L, 630S described herein.

Figure 12A:
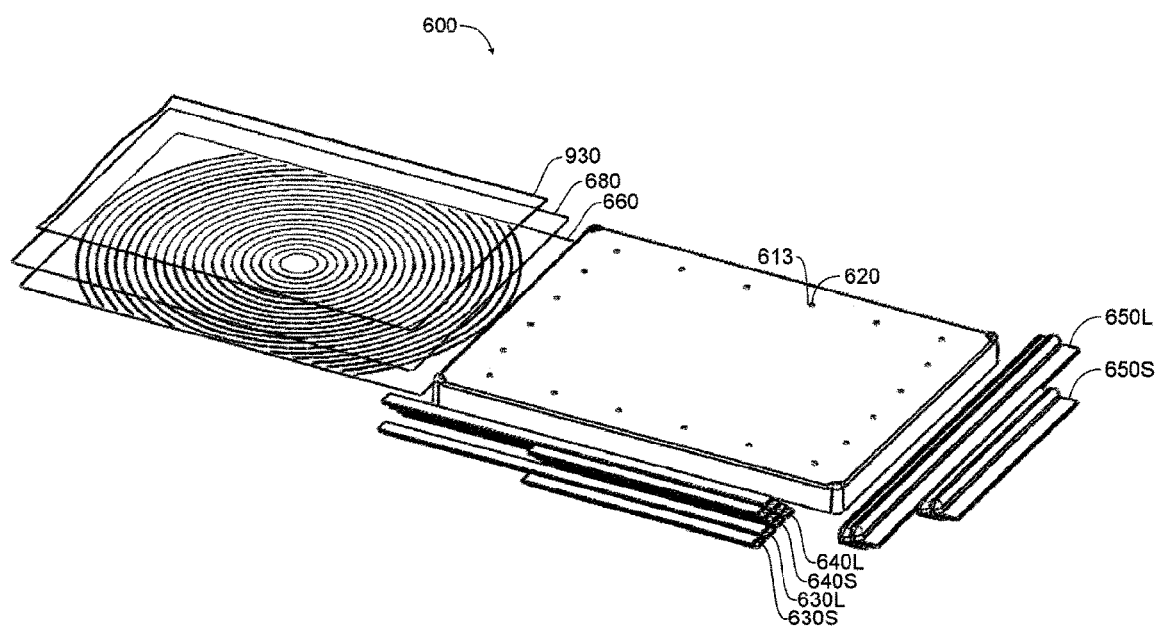
FIGS. 12A, 12B, 12C, 12D, 12E are perspective views of the magnetic rolling system for pliable material whereas a sequence of steps is shown illustrating one way in which a magnetic rolling board and rolling pin spacers, may be used in order to roll out pliable material.

Referring to FIG. 12A whereas typical components which are used in order to precisely roll out and transfer said pliable materials are shown. These components include magnetic rolling board 610, with magnetic, or ferromagnetic cylinders 620, set into reliefs 613, rolling pin spacers 630L, 630S, 640L, 640S, rolling pin spacer guides 650L, 650S, circular template 660, cutting mat 680, parchment paper 930. Any of the components discussed herein are optional and each may be used, or not used, with magnetic rolling board 610 as a particular application may require.

Figure 12B:
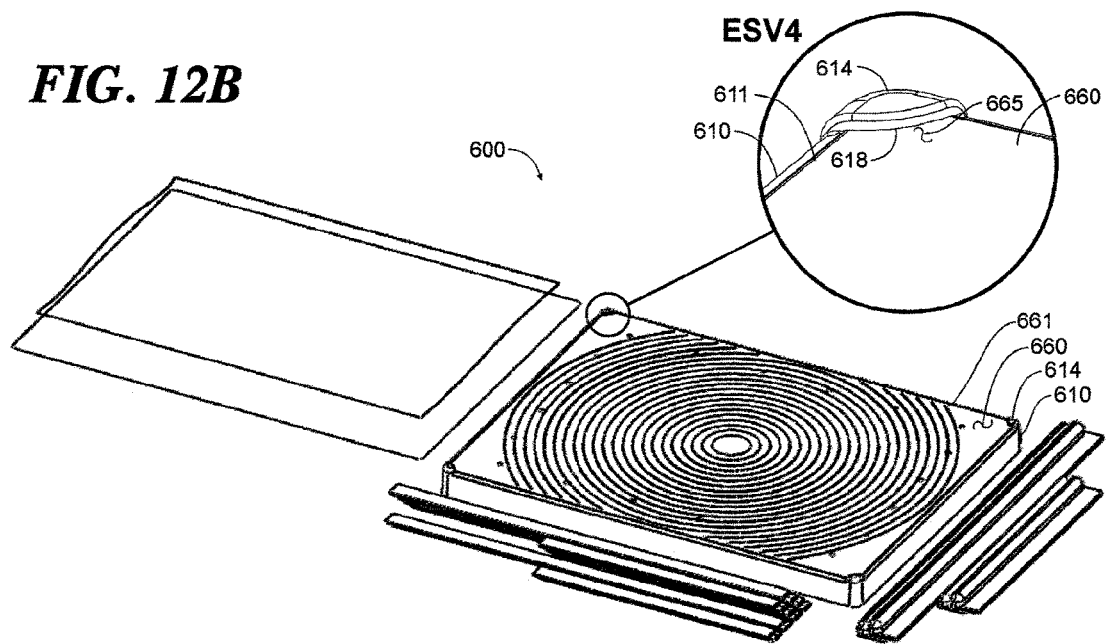

Referring to FIG. 12B whereas the circular template 660 has been placed on the top planer surface 611 of the magnetic rolling board 610, with its corners 665 tucked into the openings 618 of corner retainers 614. The circular template 660 can be used on a magnetic rolling board that does not have corner retainers as well. This is because any magnetically attracted rolling pin spacers or guides will help to hold any sheet material in place when positioned between the rolling pin spacers or guides, and the magnetic rolling board 610. Enlarged sectional view ESV4 shows a more detailed view of a circular template 660 corner 665 tucked into opening 618 of the corner retainer 614.

Figure 12C:
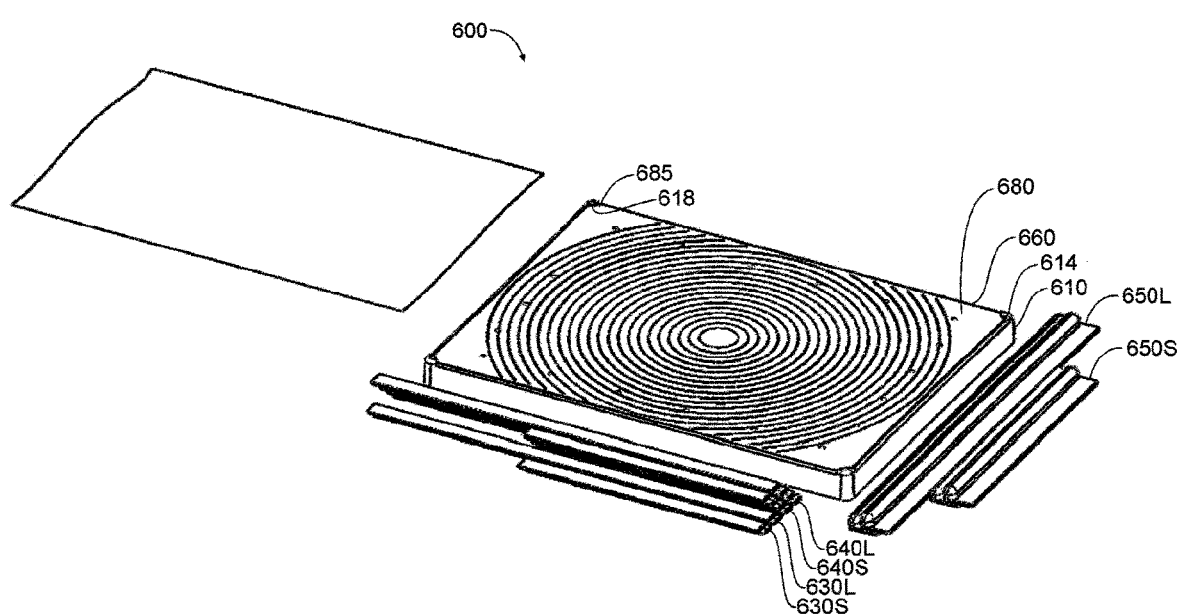

Referring to FIG. 12C whereas the cutting mat 680 has been placed on top of circular template 660, with its corners 685 also tucked into the openings 618 of corner retainers 614. The cutting mat 680 can be used on a magnetic rolling board that does not have corner retainers as well. This is because any magnetically attracted rolling pin spacers or guides will help to hold any sheet material in place that is placed between said rolling pin spacers or rolling pin guides, and the magnetic rolling board 610.

Figure 12D:
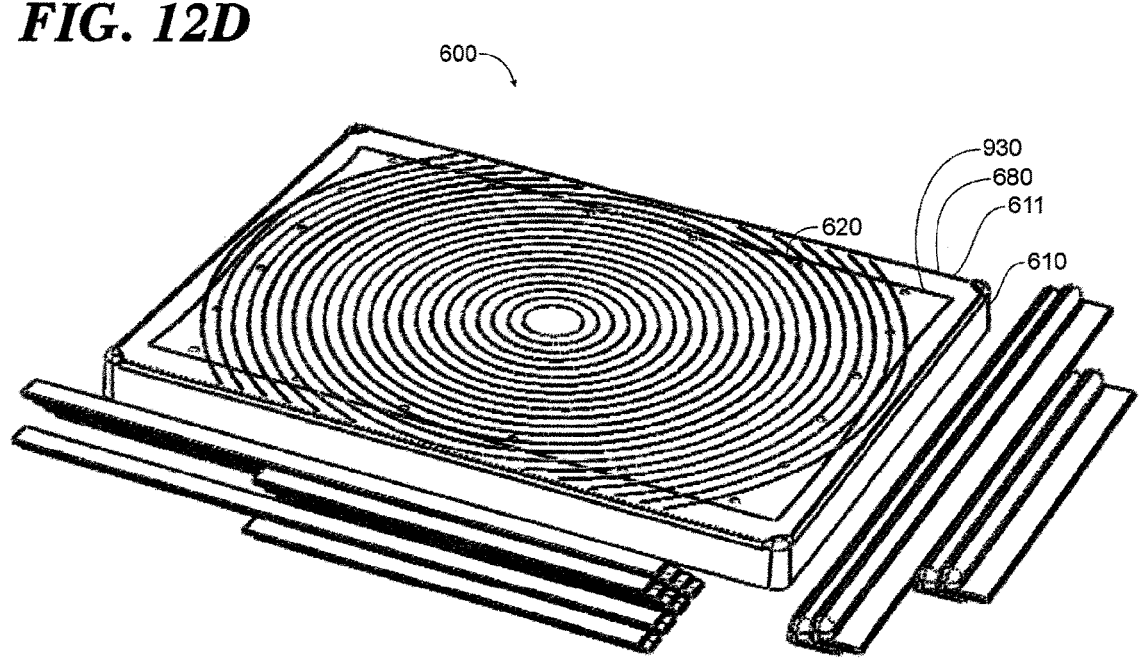

Referring to FIG. 12D whereas the backing sheet, or parchment paper, 930 has been placed on top of the cutting mat 680 with its edges overlapping the magnetic or ferromagnetic cylinders 620 which are imbedded into the surface 611 of the magnetic rolling board 610.

Figure 12E:
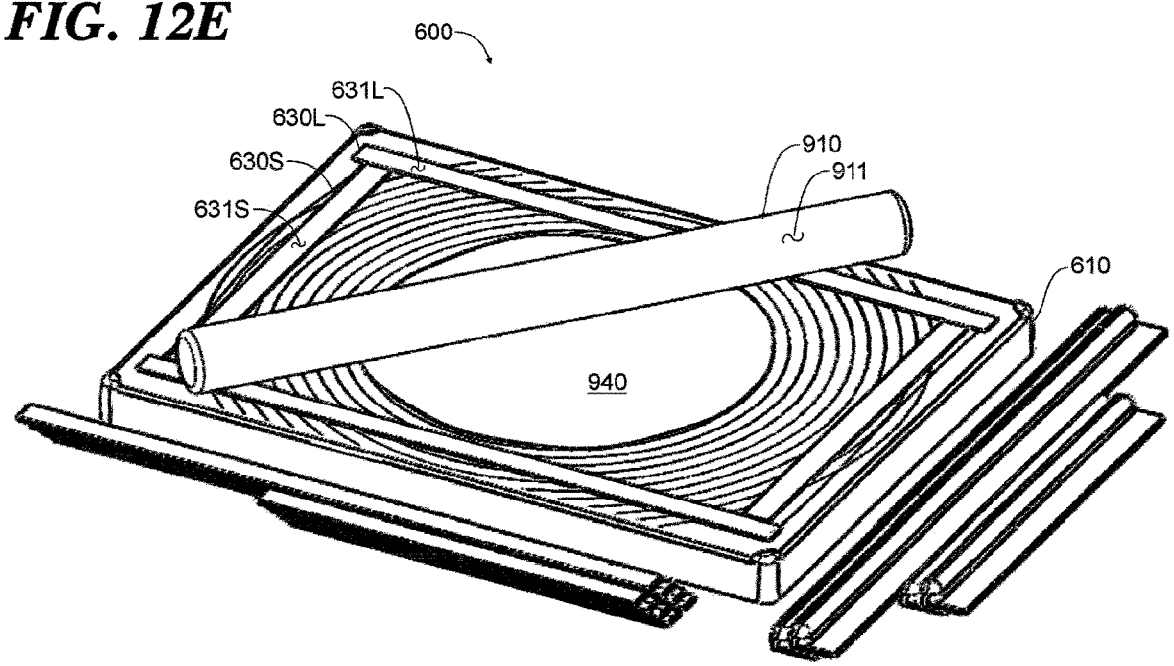

Referring to FIG. 12E whereas the thin rolling pin spacers 630L, 630S have been placed on top of magnetic rolling board 610 and manually centered along the magnetic or ferromagnetic cylinder 620 pattern, which is hidden under rolling pin spacers 630S and 630L in this view, while having any required sheeting material sandwiched between them. At this point pliable material 940 is placed at the center of the magnetic rolling board 610 and a fondant roller 910, or any other type of roller, is rolled back and forth over said pliable material 940 from different angles where the pliable material 940 will become more and more flattened until the fondant roller cylindrical face 911 comes in contact with the top planar faces 631S, 631L of rolling pin spacers 630S, 630L, where this rolling process continues until said fondant roller cylindrical face 911 remains in contact with said top planar faces 631S, 631L of rolling pin spacers 630S, 630L when rolled completely across said pliable material 940 where, at this point, said pliable material 940 will be rolled out evenly and precisely to a 1/16" thickness. Any type, shape, size, or quantity, of spacers may be used as a particular application may require for this and any other embodiment of the magnetic rolling system for pliable material.

Referring to FIGS. 13A-13E whereas, in this embodiment 600 of the magnetic rolling system for pliable material, a series of images are shown in order to illustrate how to roll out pliable material such as cookie dough, modeling clay, or any other pliable material 950 using the magnetic rolling board 610 and rolling pin spacers 630L, 630S, and rolling pin guides 650L, 650S, described herein.

Figure 13A:
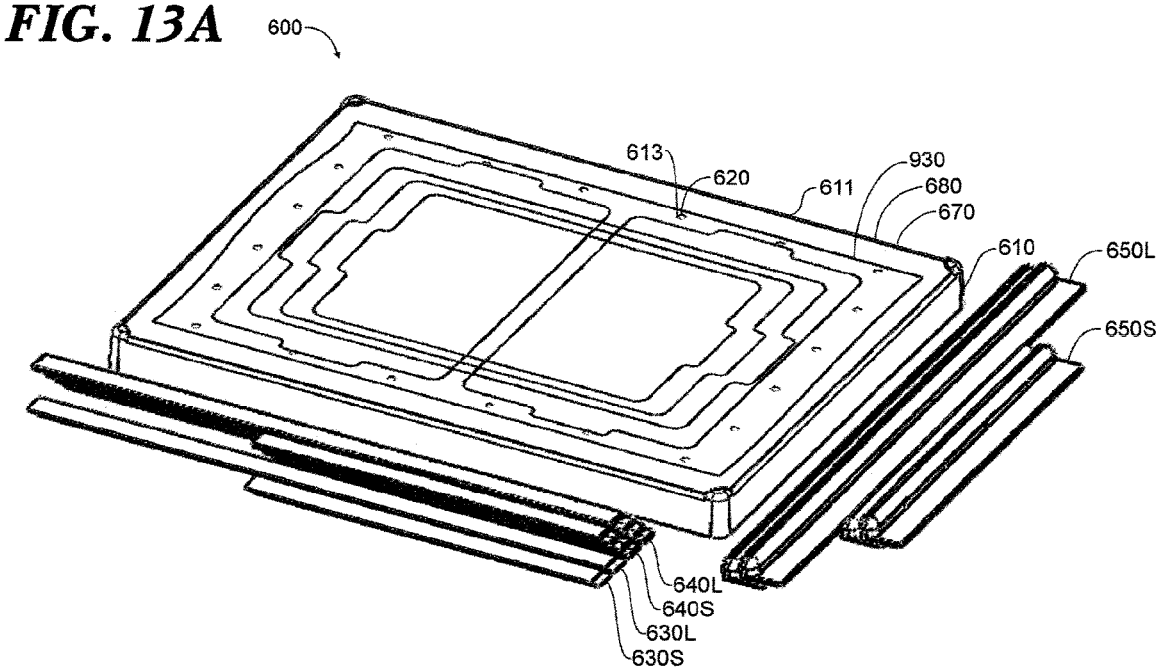
FIGS. 13A, 13B, 13C, 13D, 13E are perspective views of the magnetic rolling system for pliable material whereas a sequence of steps is shown illustrating another way in which a magnetic rolling board, rolling pin spacers, and rolling pin spacer guides, may be used in order to roll out pliable material.

Referring to FIG. 13A whereas, typical components which are used in order to precisely roll out pliable material 950, are shown. These components include magnetic rolling board 610, with magnetic, or ferromagnetic cylinders 620 set into reliefs 613, rolling pin spacers 630L, 630S, 640L, 640S, rolling pin spacer guides 650L, 650S, cookie sheet template 670, cutting mat 680, parchment or other backing paper 930. Any of the components discussed herein are optional and each one may be used, or not used, with said magnetic rolling board 610, as a particular application may require.

Figure 13B:
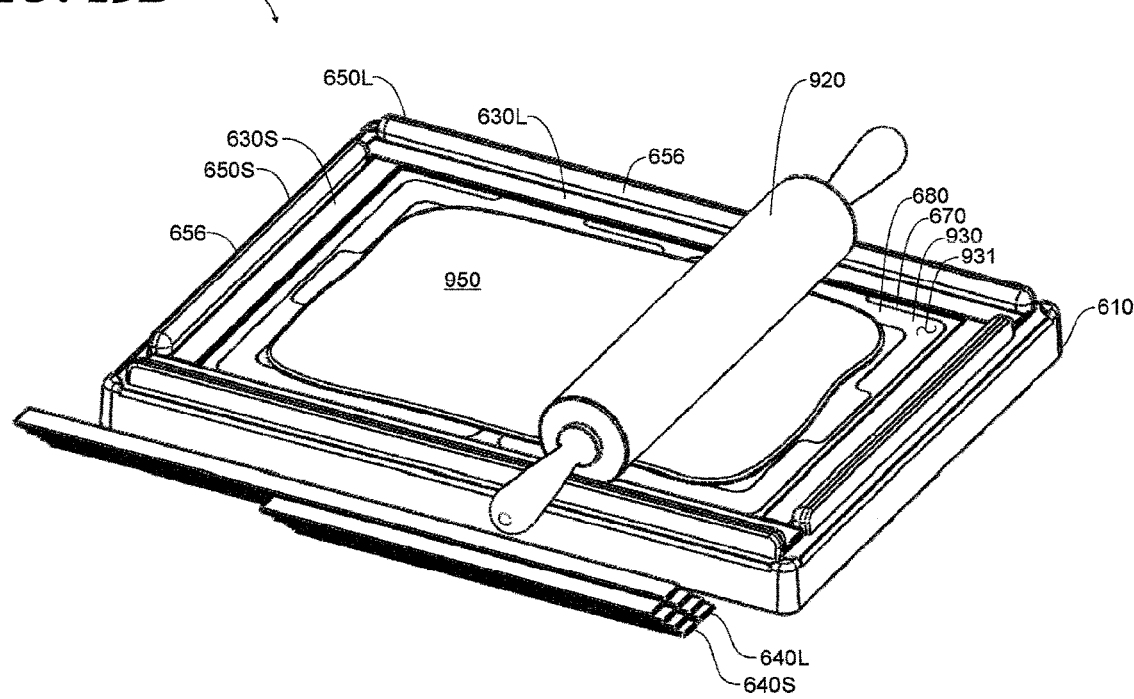

Referring to FIG. 13B whereas, the 1/8" rolling pin spacer guides 650L, 650S have been placed on top of the sheet material 670, 680, 930, and magnetic rolling board 610. Rolling pin spacer guides 650L, 650S are automatically aligned along the magnetic or ferromagnetic cylinder 620 pattern embedded within magnetic rolling board 610, which are hidden by said rolling pin spacers and guides, causing magnetic or ferromagnetic cylinders 620, disposed, not shown as they are embedded, within the rolling pin spacer guides 650L, 650S to align coaxially with their respective magnetic or ferromagnetic cylinder 620 mates, while having said sheeting material firmly sandwiched between them. The 1/16" magnetic or ferromagnetic rolling pin spacers 630L, 630S are laid on top of the top planar surface of the rolling pin spacer guides 650L, 650S, which are magnetically attracted to each other, thus making their total thickness 3/16". Pliable material 950, is centrally placed on the top planar surface 931 of parchment paper 930, and rolled out precisely to 3/16" using a standard roller 920, or the like. Because the rolling pin spacer guides 650L, 650S are used in this embodiment of the magnetic rolling system for pliable material, the rolling pin spacer guides 650L, 650S are able to keep the rolling pin 920 on track without slipping off the stacked rolling pin spacers 630L, 630S, provided the rolling pin's cylindrical rolling portion is kept between, and perpendicular to, the rolling pin guides 656.

Additional rolling pin spacers 640S, 640L may be placed on top of rolling pin spacers 630S, 630L and rolling pin spacer guides 650S, 650L that are already on the rolling board 610, in order to roll out thicker pliable material. Any type, shape, size, or quantity, of spacers may be used as a particular application may require for this and any other embodiment of the present invention.

Figure 13C:
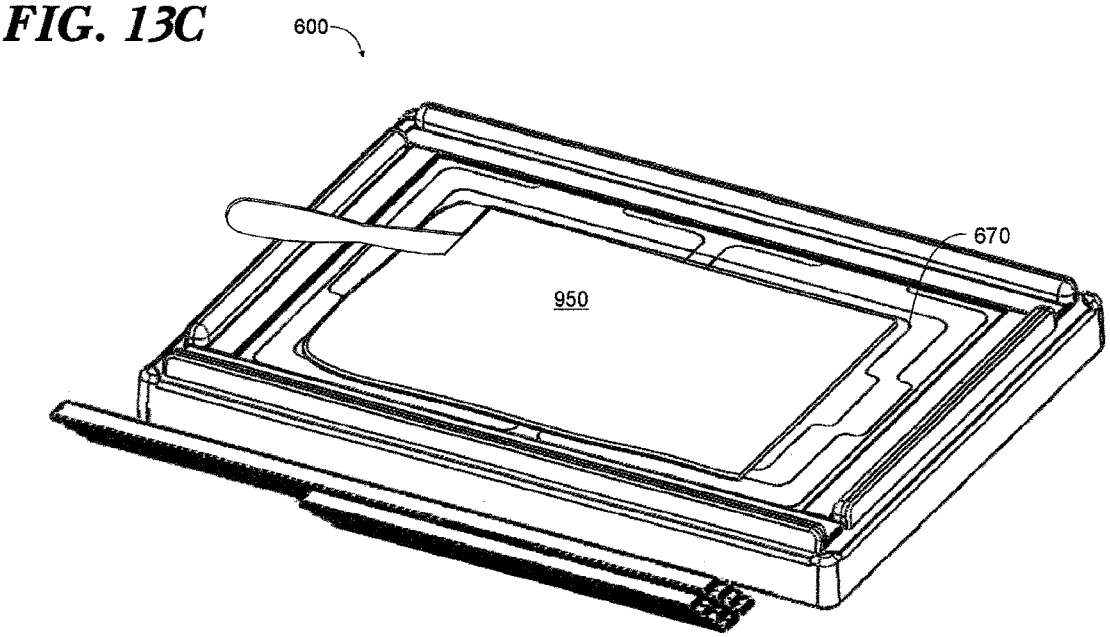

Referring to FIG. 13C whereas, the pliable material 950 has been rolled out to the desired thickness, it can be trimmed to an appropriate cookie sheet size based on the cookie sheet template 670 on which it sits.

Figure 13D:
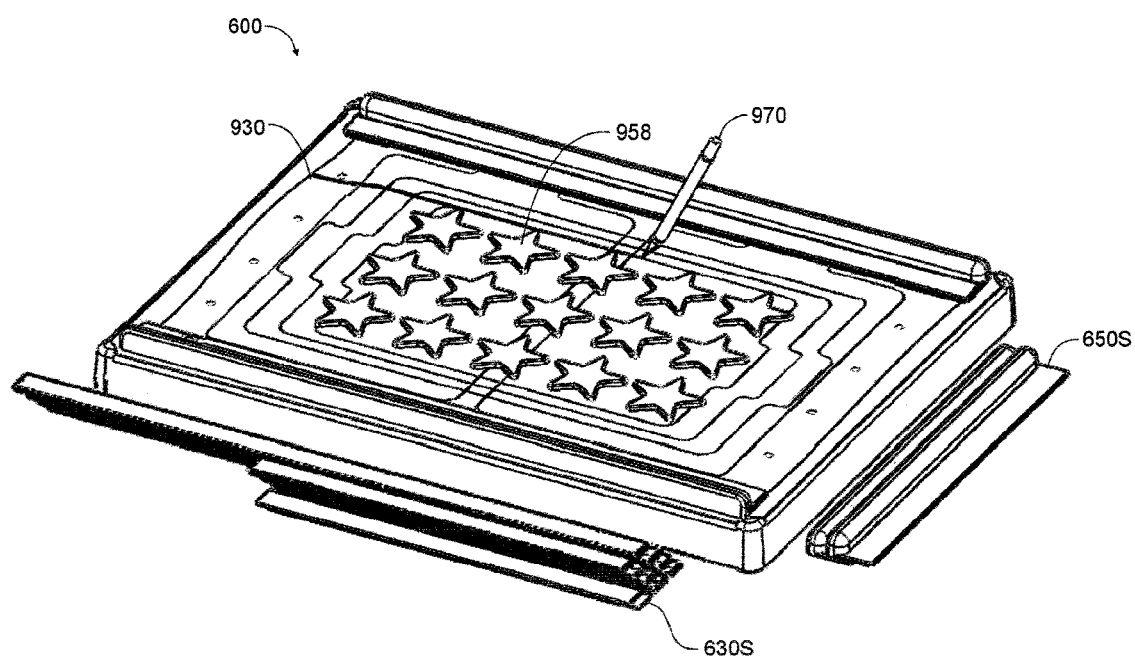

Referring to FIG. 13D whereas, the pliable material 950 has been cut to the desired shapes 958 and the excess material is removed, the short edge spacers 630S and spacer guides 650S, may be removed, and the parchment or other backing paper 930 may be trimmed with a sharp knife 970, or scissors.

Figure 13E:
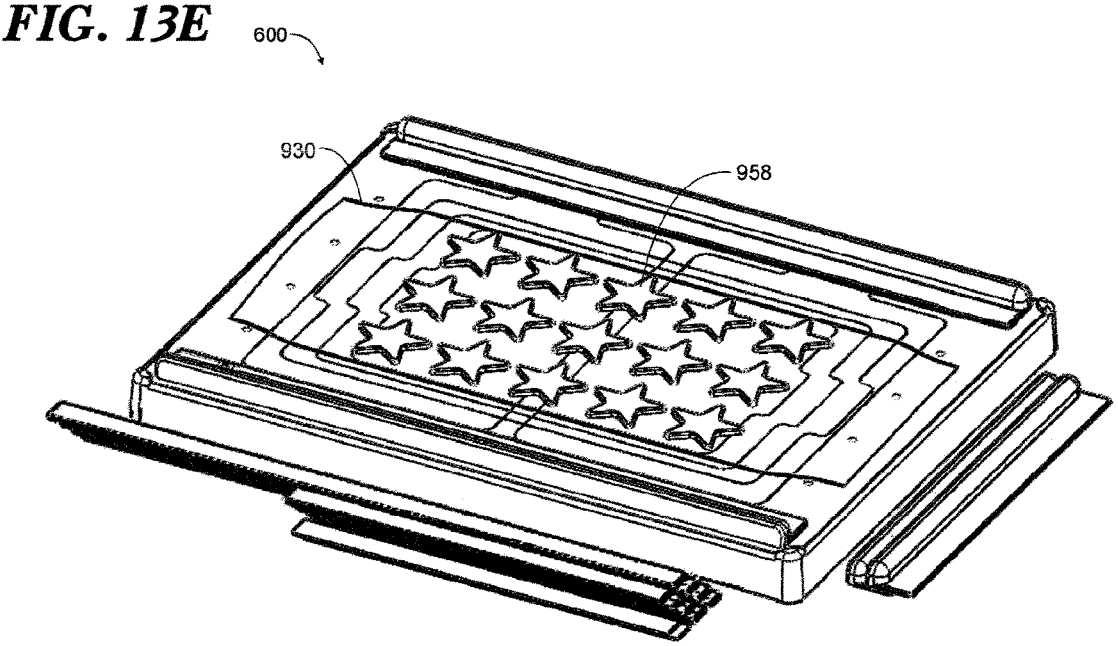

Referring to FIG. 13E whereas, once the parchment or other backing paper 930 is trimmed, it can easily be slid onto an adjacent cookie sheet, without distorting any delicate cut out shapes 958.

Figure 14A:
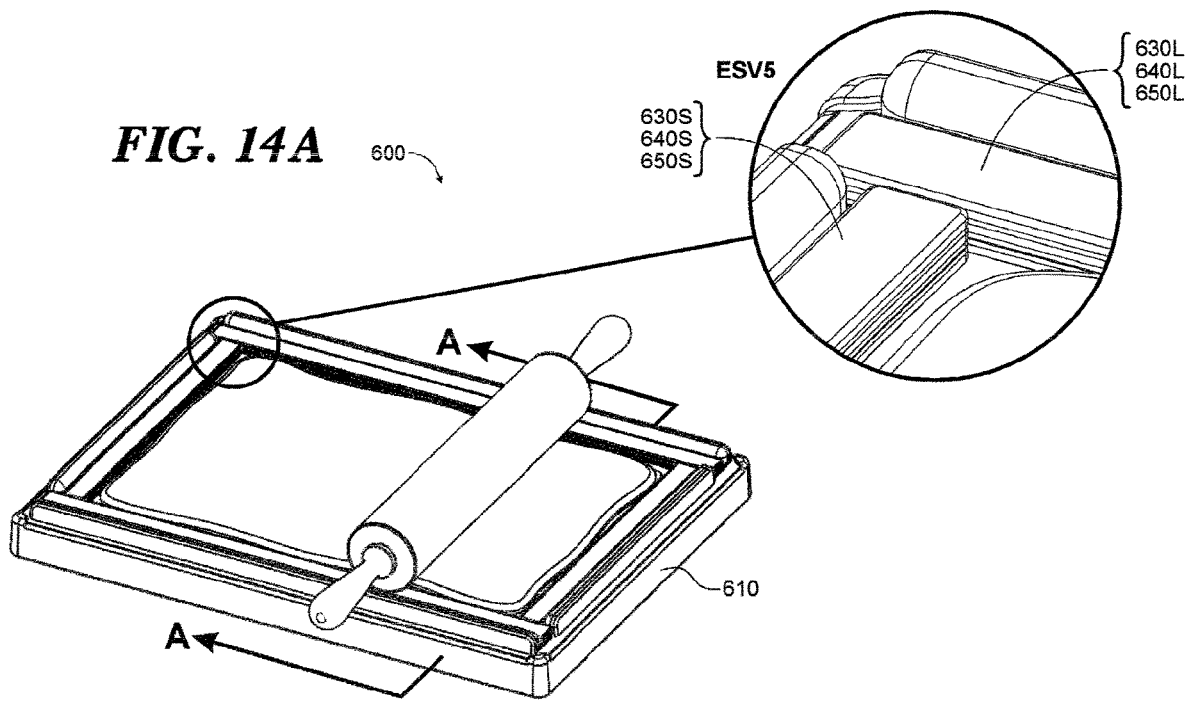
FIGS. 14A, 14B is a perspective, cross sectional, and two enlarged sectional views of the magnetic rolling system for pliable material.

Referring to FIG. 14A whereas, in this embodiment 600 of the magnetic rolling system for pliable material, the magnetic rolling board 610 is set up with all rolling pin spacers 630S, 630L, 640S, 640L and rolling pin spacer guides 650S, 650L, for a total height of 7/16" from the top planar surface of the topmost sheet material, to the top planar surface of the top rolling pin spacer in each stack. Using this configuration, a 7/16" piece of pliable material is rolled out to a precise thickness. ESV5 shows a close-up and detailed view of the far corner of the magnetic rolling board 610, of the current embodiment 600 of the magnetic rolling system for pliable material.

Figure 14B:
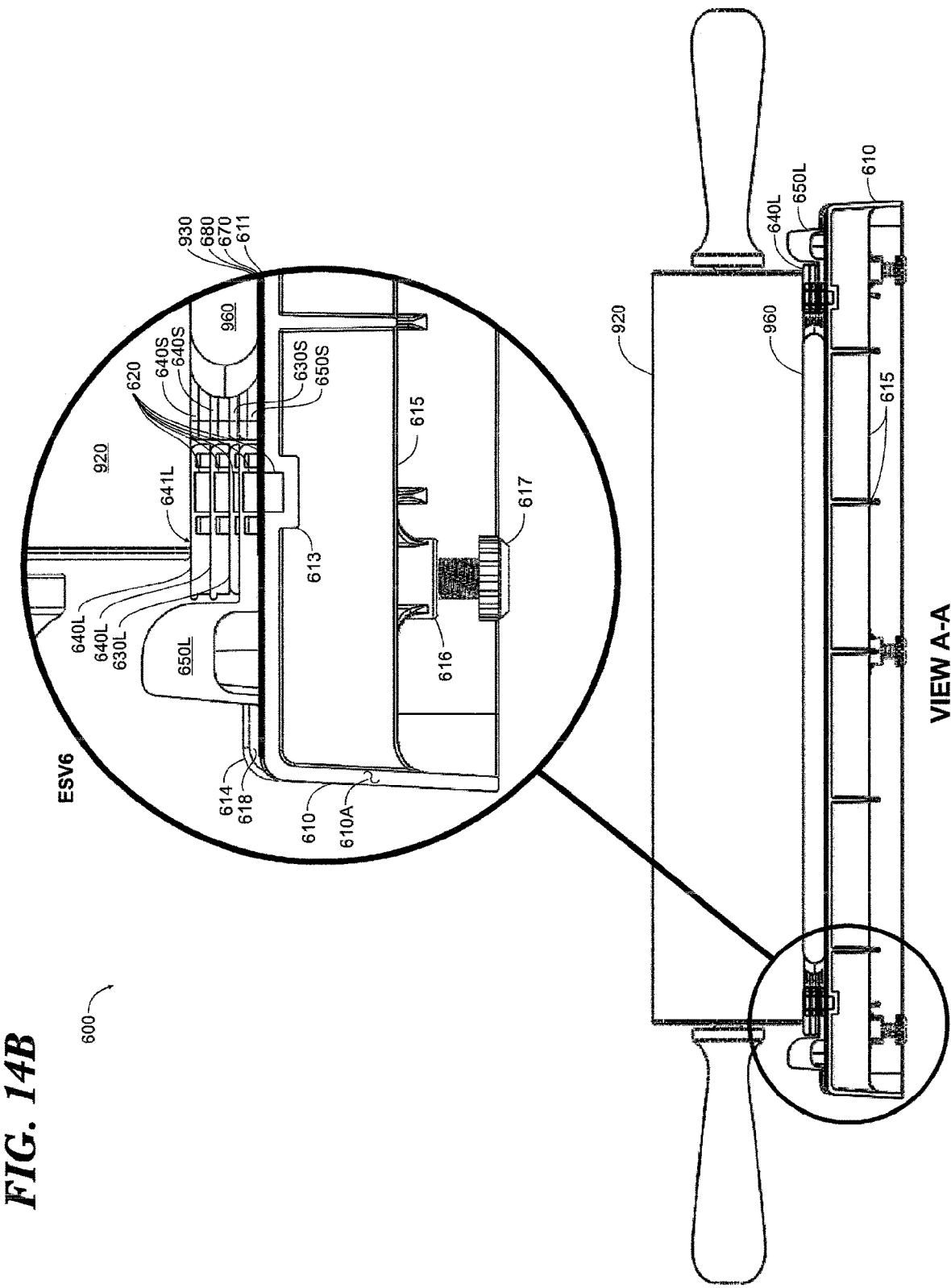

Referring to FIG. 14B whereas, in this embodiment 600 of the magnetic rolling system for pliable material, a cross-sectional view A-A from FIG. 14A is shown, in addition to enlarged sectional view ESV6. View A-A illustrates how a rolling pin 920 would roll along the top planar surface 641L of the top rolling pin spacer 640L in order to roll out pliable material 960 to a precise 7/16" thickness. ESV6 shows an enlarged sectional view of the left side of said cross sectional view A-A, whereas magnetic rolling board 610 comprises an outer shell 610A, structural ribbing 615, foot boss 616, non-skid adjustable or fixed foot 617, cylindrical magnet well 613, corner retainer 614, corner retainer opening 618. Stacked on the top planar surface 611 are sheets 670, 680, and 930, whereas the rolling pin spacer guides 650L, 650S are placed on top of the sheet material, and rolling pin spacers 630L, 630S, 640L, 640L, 640S, 640S are stacked on rolling pin spacer guides 650L, 650S. Because of the magnetic attraction between any magnetic and ferromagnetic cylinders 620, all components automatically snap together because the magnetic and ferromagnetic cylinders 620 automatically align coaxially. Any type, shape, size, or quantity, of spacers may be used as a particular application may require for this, and any other embodiment of the present invention.

Referring to FIG. 15 whereas four of the six embodiments disclosed herein of the magnetic rolling system for pliable material are shown which best exemplify its full scope. The most basic embodiment 100 of the described embodiment consists of a simple magnetic and ferromagnetic plate and spacers. Embodiment 300 of the described embodiment consists of a circular magnetic rolling board having circular and curved rolling pin spacers placed inside its perimeter, where pliable material is shown rolled out with a standard fondant rolling pin. Embodiment 400 of the described embodiment comprises a flexible rectangular magnetic pastry mat and rolling pin spacers, where said rolling mat is rolled up with its magnetic rolling pin spacers inside when not in use. Embodiment 600 of the described embodiment which comprises a rigid rectangular magnetic rolling board with rolling pin spacers and rolling pin guides is shown, whereas pliable material is rolled out with a standard rolling pin.

Although this invention has been described in the above forms with a certain degree of particularity, it is understood that the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention which is defined in the claims and their equivalents.

What is claimed is:

1. A magnetic rolling system for pliable material comprising:
    a magnetic rolling board, having a top planar surface;
    said magnetic rolling board having a plurality of magnetic objects embedded just below said top planar surface whereby said magnetic rolling board is configured to magnetically attract and be magnetically attracted to, a plurality of rolling pin spacers which are placed on, and magnetically attached to, said top planar surface; and
    said plurality of rolling pin spacers having a length and width and all having top planar surfaces, configured to magnetically attract and be magnetically attracted to, said magnetic rolling board;
    said magnetic rolling board further comprises a shelled out bottom interior surface with a network of structural ribbing disposed therein, while having a plurality of cylindrical magnet wells which are vertical cylindrical channels formed into, and perpendicular to, said top planar surface and located throughout in a pattern along and just inside an outer perimeter of said magnetic rolling board; and
    said plurality of cylindrical magnet wells are configured to embed said plurality of magnetic objects just below said top planar surface of said magnetic rolling board.

2. The magnetic rolling system of claim 1 wherein said pliable material is of one pliable material selected from the group consisting of, a cookie dough, a pie crust, a fondant, a clay, an epoxy compound, and any other pliable material.

3. The magnetic rolling system of claim 1 wherein said magnetic rolling board having a form of a rigid board and said plurality of cylindrical magnet wells comprise a plurality of said vertical cylindrical channels formed into said top planar surface to a depth that will cause said magnetic objects to be positioned just below said top planar surface when said magnetic objects are inserted into the full depth of each of the vertical channels.

4. The magnetic rolling system of claim 1 wherein:
    said magnetic rolling board comprises a magnetic rolling board having a shape of a plate form of any perimeter shape, having a top and bottom planar surface, made of rigid magnetic or ferromagnetic material, which in turn magnetically attracts, or is magnetically attracted to, rolling pin spacers which magnetically attach to said magnetic rolling board top planar surface; and
    said plurality of rolling pin spacers comprises a variety of rolling pin spacers, each having a length and a width, all having a top and bottom planar surface, shaped to contour a portion of an inside perimeter of said magnetic rolling board, are made of rigid magnetic or ferromagnetic material, or flexible magnetic material, which in turn magnetically attract, or are magnetically attracted to, said magnetic rolling board, and are placed on said magnetic rolling board's top planar surface, and just inside said magnetic rolling board's perimeter, and are magnetically attracted to, and may be stacked on top of, each other, in order to increase a total spacer thickness, thus creating a desired height difference between a single, or an uppermost stacked, said spacer top planar surface and said magnetic rolling board's top planar surface.

5. The magnetic rolling system of claim 1 wherein said magnetic rolling board is made from a wood material or a plastic material.

6. The magnetic rolling system of claim 1 wherein said rolling pin spacers are configured to be used in combination with any other magnetic rolling board, magnetic rolling mat, magnetic rolling plate, and rolling pin spacers.

7. The magnetic rolling system of claim 1 wherein said magnetic rolling board comprises a rigid magnetic rolling board further having a bottom planar surface.

8. A magnetic rolling system for pliable material comprising:
    a rolling board, having a top planar surface and a parallel bottom planar surface;
    said rolling board is a metal plate configured to be magnetically attracted to, and magnetically attach to, a bottom planar surface of a rolling pin spacer;
    said rolling board comprising a single sheet of metal or metal alloy;
    said rolling pin spacer, having said bottom planar surface and a parallel top planar surface;
    said rolling pin spacer comprising a nonmagnetic material and one or more magnetic objects embedded within whereby said rolling pin spacer is configured to be magnetically attracted to said rolling board's top planar surface;

said rolling board is made of a ferromagnetic metal or ferromagnetic metal alloy;

said rolling board is magnetically attracted to and magnetically attaches to said magnetic rolling pin spacer;

said rolling pin spacer is rigid having top and bottom planar surfaces;

said rolling pin spacer top and bottom planar surfaces are parallel;

said rolling pin spacer shape contours an inside perimeter of said rolling board;

said rolling pin spacer is of a uniform thickness, measured between said top and bottom planar surfaces; and said rolling board and rolling pin spacer magnetically attach at their respective planar faces.

9. The magnetic rolling system for pliable material of claim 8 wherein:

said pliable material is of one pliable material selected from a group of, a cookie dough, a pie crust, a fondant, a clay, an epoxy compound, and any other pliable material.

10. The magnetic rolling system for pliable material of claim 8 wherein:

said rolling board is a single metallic flat rigid plate; and said rolling board perimeter shape is one from a group of, rectangular, circular, and any other shape.

11. The magnetic rolling system for pliable material of claim 8 wherein:

said rolling board is made of a single plate of a ferromagnetic metal or ferromagnetic metal alloy;

said rolling board is magnetically attracted to and magnetically attaches to said magnetic rolling pin spacer; and whereby said rolling pin spacer is placed along the inside perimeter of, and is magnetically attached to, said rolling board's top planar surface.

12. The magnetic rolling system for pliable material of claim 8 wherein:

said rolling board is magnetically attracted to and magnetically attaches to nonmagnetic rolling pin spacers having magnetic objects embedded within.

13. The magnetic rolling system for pliable material of claim 8 wherein:

said rolling board is a single plate attached to a rigid base; and whereby said rigid base provides stability to said rolling board.

14. The magnetic rolling system for pliable material of claim 8 wherein:

said rolling pin spacer is a single rolling pin spacer; and said rolling pin spacer contours at least two opposing edges of said rolling board's inside perimeter.

15. The magnetic rolling system for pliable material of claim 8 wherein:

said rolling pin spacer is a plurality of rolling pin spacers.

16. The magnetic rolling system for pliable material of claim 15 wherein:

said plurality of rolling pin spacers consist of a set of at least two rolling pin spacers;

all rolling pin spacers of each rolling pin spacer set are of the same unique uniform thickness, measured between said top and bottom planar surfaces; and the thickness between sets of rolling pin spacers may vary, or be equal.

17. The magnetic rolling system for pliable material of claim 8 wherein:

said rolling pin spacer is made of a ferromagnetic metal or metal alloy;

said rolling pin spacer is magnetically attracted to and attaches to said rolling board; and whereby said rolling pin spacer may be placed along, and magnetically attached to, said rolling board's inner perimeter.

18. The magnetic rolling system for pliable material of claim 8 wherein:

said rolling pin spacer is made of a magnetized metal or metal alloy;

said rolling pin spacer is magnetically attracted to and magnetically attaches to said ferromagnetic rolling board; and said rolling pin spacer is magnetically attracted to and magnetically attaches to said magnetic rolling board.

19. The magnetic rolling system for pliable material of claim 12 wherein:

said rolling pin spacer is made of a rigid non-magnetic and non-ferromagnetic material of one selected from a group consisting of, aluminum, wood, plastic, and any other rigid material that is not magnetically attracted to said magnetic rolling board;

a plurality of ferromagnetic objects are embedded within said rolling pin spacer;

said plurality of ferromagnetic objects are in the shape of a disk or stout cylinder, or may be of any shape, where their thickness is equal to, or less than, the thickness of their respective rolling pin spacer;

said plurality of ferromagnetic objects are positioned centrally along the length of said rolling pin spacer; and whereby said plurality of ferromagnetic objects are magnetically attracted to, and cause said rolling pin spacer to magnetically attach to said magnetic rolling board.

20. The magnetic rolling system for pliable material of claim 8 wherein:

said rolling pin spacer is made of a rigid non-magnetic or non-ferromagnetic material of one selected from the group consisting of, aluminum, wood, plastic, and any other rigid material that is not magnetically attracted to a magnetic rolling board;

a plurality of magnetic objects are embedded within said rolling pin spacer;

said plurality of magnetic objects are in the shape of a disk or stout cylinder, or may be of any shape, where their thickness is equal to, or less than, the thickness of their respective rolling pin spacer;

said plurality of magnetic objects are positioned centrally along the length of said rolling pin spacer; and whereby said plurality of magnetic objects are magnetically attracted to, and cause said rolling pin spacer to magnetically attach to both, a ferromagnetic rolling board, and a magnetic rolling board.

21. A method for using said magnetic rolling system for pliable material of claim 8 in order to flatten said pliable material to a predetermined thickness, said method comprising:

placement of appropriate rolling pin spacers on top of said rolling board, along and inside an outer perimeter of said rolling board, whereas said rolling pin spacers are magnetically attached to said rolling board top planar surface;

additional rolling pin spacers are stacked onto first said rolling pin spacers in the same manner, as needed in order to achieve the predetermined height for said pliable material to be rolled out and flattened to;

any flour, or other nonstick material, is applied to said pliable material, rolling pin, and rolling board as required throughout this process;

said pliable material is placed at the approximate center of said rolling board;

said rolling pin is used to roll out and flatten said pliable material while keeping said rolling pin centered and level over said rolling board, alternating directions along the length and width of said rolling board while rolling on top of said pliable material, pushing said pliable material further down and flattening said pliable material, until said rolling pin remains in constant contact with two opposing said rolling pin spacers from one edge of said pliable material to its opposite edge, in two perpendicular directions along the length and width of said rolling board while straddling two opposing edges of said rolling board; and whereby said pliable material is now precisely flattened to said predetermined thickness and may be removed, or said pliable material may then be further processed, while on said rolling board, with tasks including cutting and shaping.

* * * * *